US008599685B2

(12) United States Patent
Evans et al.

(10) Patent No.: US 8,599,685 B2
(45) Date of Patent: Dec. 3, 2013

(54) SNOOPING OF ON-PATH IP RESERVATION PROTOCOLS FOR LAYER 2 NODES

(75) Inventors: John Evans, London (GB); Francois L. Le Faucheur, Valbonne (FR); Bruce Thompson, Saratoga, CA (US); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 797 days.

(21) Appl. No.: 11/535,339

(22) Filed: Sep. 26, 2006

(65) Prior Publication Data

US 2008/0075089 A1 Mar. 27, 2008

(51) Int. Cl.
*G01R 31/08* (2006.01)

(52) U.S. Cl.
USPC ........... 370/230; 370/235; 370/389; 370/397; 370/467

(58) Field of Classification Search
USPC .......................................... 370/389, 397, 467
See application file for complete search history.

(56) References Cited

U.S. PATENT DOCUMENTS

| | | | | |
|---|---|---|---|---|
| 6,671,276 B1* | 12/2003 | Bakre et al. | ................. | 370/395.1 |
| 6,765,927 B1* | 7/2004 | Martin et al. | ................. | 370/469 |
| 6,847,638 B1* | 1/2005 | Wu et al. | ....................... | 370/389 |
| 7,254,738 B1* | 8/2007 | Oh | .................................... | 714/4 |
| 7,301,951 B2* | 11/2007 | Chen et al. | ................ | 370/395.52 |
| 7,787,447 B1* | 8/2010 | Egan et al. | ..................... | 370/389 |
| 2003/0076838 A1* | 4/2003 | Shaio et al. | ................. | 370/395.5 |
| 2003/0086425 A1* | 5/2003 | Bearden et al. | ................ | 370/392 |
| 2005/0232263 A1* | 10/2005 | Sagara | .......................... | 370/389 |
| 2006/0168337 A1* | 7/2006 | Stahl et al. | ..................... | 709/240 |
| 2008/0095045 A1* | 4/2008 | Owens et al. | ................. | 370/220 |

FOREIGN PATENT DOCUMENTS

WO WO2007039007 * 4/2007

OTHER PUBLICATIONS

Yavatkar et al , a protocol for RSVP-based admission control over IEEE 802-style networks, May 2000, 75 pages.*
Yabatkar et al, SBM (Subnet bandwidth Management), May 2000, RFC 2814, 121 pages.*
Thayumanavan Sridhar, Layer 2 and Layer 3 Switch Evolution,Sep. 1998, Volume1, No. 2.*

* cited by examiner

*Primary Examiner* — Ayaz Sheikh
*Assistant Examiner* — Mounir Moutaouakil
(74) *Attorney, Agent, or Firm* — P. Su

(57) ABSTRACT

Methods and apparatus for enabling a layer 2 node associated with an open systems interconnection (OSI) reference model to perform resource reservation protocol (RSVP) processing are disclosed. According to one aspect of the present invention a layer 2 device associated with an OSI reference model includes a first interface, a processing arrangement, and a second interface. The first interface intercepts a message associated with a on-path signaling protocol for at least one selected from a group including resource reservation and admission control at a layer above layer 2. The processing arrangement processes the message, and the second interface sends the message.

35 Claims, 16 Drawing Sheets

SNOOPING OF ON-PATH IP RESERVATION PROTOCOLS FOR LAYER 2 NODES

BACKGROUND OF THE INVENTION

1. Field of Invention

The present invention relates generally to internet protocol (IP) signaling in networks. More particularly, the present invention relates to extending a resource reservation protocol for use in enabling on-path admission control at Ethernet switching hops located between IP hops.

2. Description of the Related Art

An on-path Internet Protocol (IP) reservation protocol is a reservation protocol in which reservation messages and reservation state are established and maintained along the path between an IP sender and IP receiver. One example of an on-path IP reservation protocol, or an on-path signaling protocol, is a resource reservation protocol (RSVP). RSVP is used in networks that enable Internet applications to obtain quality of service for their traffic. RSVP, while not a routing protocol, works in conjunction with routing protocols such as unicast and multicast routing protocols. RSVP effectively carries a request through elements of a network, and attempts to make a resource reservation at each appropriate element in order to achieve a particular quality of service end to end.

To attempt to make a resource reservation at a network element, e.g., at a router or a server, in response to a resource reservation request, an RSVP daemon of the network element may communicate with an admission control module of the network element. The admission control module generally ascertains whether the network element is able to accommodate the resource reservation request, i.e., whether the network element is able to provide the requested quality of service. If the network element does not have sufficient resources to provide the requested quality of service, an error notification is sent to the application that initiated the resource reservation request. Otherwise, a resource reservation is made at the network element.

Typically, a resource reservation request begins with a path (PATH) message being sent from a sender or a source to a receiver or a destination. After receiving the PATH message, the receiver sends a reservation (RESV) message back to the sender. The network elements traversed by the PATH message and the RESV message may include IP capable network elements, e.g., layer 3 elements with respect to the Open Systems Interconnection (OSI) reference model specification which may thus be RSVP capable, and network elements that are not IP capable, e.g., layer 2 elements with respect to the OSI reference model specification such as Ethernet switches, which therefore are not RSVP capable. It should be appreciated that some layer 3 elements are also not RSVP capable.

FIG. 1 is a block diagram representation of a network with IP-capable network elements and a non IP-capable Ethernet switch, in which a resource reservation is to be made. In a network 100, a sender 104 that has a sender or source IP address of IP_0 sends a PATH message 122 towards a receiver 118. PATH message 122 includes the sender IP address of IP_0 and a receiver IP address of IP_3. Before PATH message 122 reaches receiver 118, PATH message 122 passes through RSVP capable routers 106, 114 and an Ethernet switch 110, which is not IP capable and (hence) not RSVP capable. Assuming that PATH message 122 reaches receiver 118, receiver 118 originates a RESV message 126 that traverses RSVP capable routers 114, 108 and Ethernet switch 110 en route to sender 104. Routers 114, 108 each have IP and media access control (MAC) addresses, and are arranged to reserve resources in response to RESV message 126.

With reference to FIG. 2A, one method of attempting to establish path states prior to reserving resources in network 100 of FIG. 1 by sending a PATH message will be described. A process 200 of initiating the reservation of resources in network 100 of FIG. 1 using a PATH message begins at step 202 in which a sender sends a PATH message towards a receiver. The PATH message specifies an IP address associated with the sender, as for example an IP address of IP_0, and an IP address associated with the receiver, as for example an IP address of IP_3. The PATH message also specifies an IP address indicating the RSVP hop, as for example an IP address of IP_0 since the sender is the first RSVP hop. In step 204, a first router receives the PATH message and processes the PATH message as an RSVP message. Typically, when the first router identifies a Router Alert option in the IP header and identifies IP protocol number 46 in the PATH message, the first router initiates RSVP processing. RSVP processing of the PATH message includes updating the IP address of the RSVP hop, which in this case is set by the first router to IP_1. RSVP processing may include using a routing table to determine a layer 3 next hop and, hence, an outbound interface for the PATH message. As shown in FIG. 1, the next layer 3 hop towards the receiver is a second router with a MAC address of MAC_2. Hence, the first router sets a specified source MAC address in the Ethernet Header of the frame carrying the PATH message to its own MAC address, i.e., MAC_1, and sets a specified destination MAC address in the Ethernet header of the frame carrying the PATH message to MAC_2.

As will be appreciated by those skilled in the art, errors may occur during RSVP processing. By way of example, an error may occur if the first router effectively has no route or path to the receiver. Hence, in step 206, it is determined if an error has arisen during RSVP processing. If it is determined that an error has arisen, a path error (PATH_ERR) message is returned to the sender in step 207, and the process of reserving resources is terminated.

Alternatively, if the determination in step 206 is that no error has occurred during RSVP processing, the process flow proceeds to step 208 in which the first router forwards the path message to the Ethernet switch in the path between the first router and the second router. The routing table of the first router is used to identify the interface towards the Ethernet switch as being in the path towards the second router. The Ethernet switch is not an IP capable device and, as a result, is not even aware that the Ethernet frame actually carries an RSVP message. Thus, the Ethernet switch performs no RSVP processing and forwards the PATH message using the specified MAC addresses inside the Ethernet Header. Conventional rules of bridging are generally used by the Ethernet switch to forward the Ethernet frame which carries the PATH message using the MAC addresses to the second router in step 210. As will be appreciated by those skilled in the art, the Ethernet switch does not update any addresses specified in the PATH message.

On receipt of the PATH message, the second router will notice that its IP Header contains the Router Alert option and has an IP protocol number of 46 and hence initiate RSVP processing. The second router processes the path message in step 212 and uses a routing table to determine a layer 3 next hop. The second router also updates the IP address on the RSVP hop and sets it to IP_2. A determination is made in step 214 as to whether an error has arisen during RSVP processing. If it is determined that an error has arisen, a PATH_ERR message is returned towards the sender in step 214. When the second router returns the PATH_ERR message, the PATH_ERR message is returned with a source MAC address of the second router and a destination MAC address of the first router. Once the error message is returned to the sender, the process of establishing path states is terminated.

Returning to step 214, if it is determined that no error has arisen during RSVP processing, the indication is that the PATH message may be forwarded by the second router further towards its receiver. As such, the second router forwards the PATH message in step 216 to the receiver using the routing table of the second router to identify the path to the receiver. After the PATH message is forwarded to the receiver, the process of establishing path state end to end is completed. Note that each RSVP hop now knows the previous RSVP hop from the sender to the receiver.

When a PATH message is successfully received at a receiver, the receiver can send a RESV message back towards the sender of the PATH message to reserve resources. To ensure that the RESV message is sent along the same path used by the PATH message, the RESV message is routed hop-to-hop using path state information, including a previous RSVP hop, that was effectively set up during the processing of the PATH message. FIG. 2B is a process flow diagram which illustrates steps associated with processing a RESV message in network 100 of FIG. 1. A process 230 of reserving resources using a RESV message begins at step 232 in which a receiver sends a RESV message towards a sender with destination and source IP addresses specified. That is, the RESV message is sent by the receiver with a source IP address of IP_3, as receiver 118 of FIG. 1 is the source of the RESV message, and a destination IP address of IP_2, as second router 114 of FIG. 1 is the previous RSVP hop on the path from the sender to the receiver.

After being sent towards the sender, the RESV message is received and processed as an RSVP message in step 234 by the second router. The second router, i.e., router 114 of FIG. 1, identifies the RESV message as being an RSVP message. Path state information set up by the path message will be used by the first router to identify the next hop to which to forward the RESV message. A determination is made in step 236 as to whether there is an error in RSVP processing. An error may arise, for example, if there is an admission control failure relative to the second router. If it is determined that an error has arisen during RSVP processing by the second router, the second router returns a RESV error (RESV_ERR) message to the receiver, i.e., the originator of the RESV message, in step 237, and the processing of a RESV message is completed. The RESV_ERR message is returned with a source IP address set as the IP address of the second router, namely IP address IP_2, and a destination IP address set as the IP address of the RSVP next hop, namely IP address IP_3.

Alternatively, if it is determined in step 236 that there has been no error in RSVP processing, the second router forwards the RESV message to the Ethernet switch that is in the path between the second router and the first router. The second router generates the RESV message with a source addresses set to an address of the second router, and with a destination address set to an address of the first router. Upon receiving the RESV message, the Ethernet switch forwards the RESV message to the first router using MAC addresses in step 240. As the Ethernet switch is not an RSVP capable device, the Ethernet switch uses layer 2 address information to determine how to forward the RESV message. The Ethernet switch does not update addresses in the RESV message.

Once the Ethernet switch forwards the RESV message to the first router, the first router processes the RESV message as an RSVP message in step 242. Path state information set up by the path message will be used by the first router to identify the next hop to which to forward the RESV message. It is determined in step 244 whether an error has occurred in the course of RSVP processing. If it is determined that an error has occurred, then the first router returns a RESV_ERR message to the receiver in step 245. The RESV_ERR message is sent by the first router to the receiver with a source IP address of the RESV_ERR message set as the IP address of the first router, i.e., IP address IP_1, and with the destination IP address of the RESV_ERR message set as the IP address of the next RSVP hop, i.e., IP address IP_2. After the RESV_ERR message is sent, the processing of a RESV message is completed.

Returning to step 244, if it is determined that RSVP processing by the first router has not resulted in an error, then the first router forwards the RESV message to the sender using its routing table to identify a suitable outbound interface in step 246. Once the RESV message is forwarded to the sender, the processing of a RESV message is successfully completed.

Ethernet switches are not capable of providing admission control capabilities. In other words, Ethernet does not provide native admission control functionality available relative to layer 2 devices or layer 2 networks. Hence, though a path may effectively be reserved, if that path passes through an Ethernet switch or an Ethernet network, traffic sent on the reserved path may encounter congestion due to insufficient capacity when the traffic reaches the Ethernet switch or the Ethernet network.

To provide some admission control capabilities for layer 2 devices, an RSVP subnet bandwidth manager (SBM) may be implemented on each layer 2 device and on each edge device, or device on the edges of a layer 2 device or a layer 2 network. SBM is an extension of the RSVP protocol that enables on-path admission control at Ethernet hops located between IP hops, and is specified in RFC2814, which is incorporated herein by reference. Referring again to FIG. 1, Ethernet switch 110 may be an Ethernet hop that includes a SBM and a MAC layer agent, and routers 106, 114 may be IP hops that include SBM clients.

To implement SBM, an Ethernet hop inserts itself as an RSVP hop in the signaling path. This generally requires that the Ethernet hop implements an IP host functionality which includes having IP reachability into the layer 2 cloud and being allocated an IP address in this layer 2 cloud. Moreover, where multiple virtual local area networks (VLANs) are used in a layer 2 domain, the use of SBM to achieve admission control in substantially all the VLANs would generally require that the Ethernet hop implements an IP host functionality in each VLAN, and utilizes one separate IP address in each VLAN. Implementing such IP host functionality typically results in a more complicated implementation relative to an Ethernet hop, requires significant administration, and impacts scalability. Thus, providing admission control over an Ethernet hop via SBM may be inefficient.

Therefore, what is needed is a system that allows RSVP to be extended such that layer 2 devices may provide on-path signaling control without supporting IP forwarding functionality. That is, what is desired is a method and an apparatus for efficiently providing admission control capabilities for layer 2 devices.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
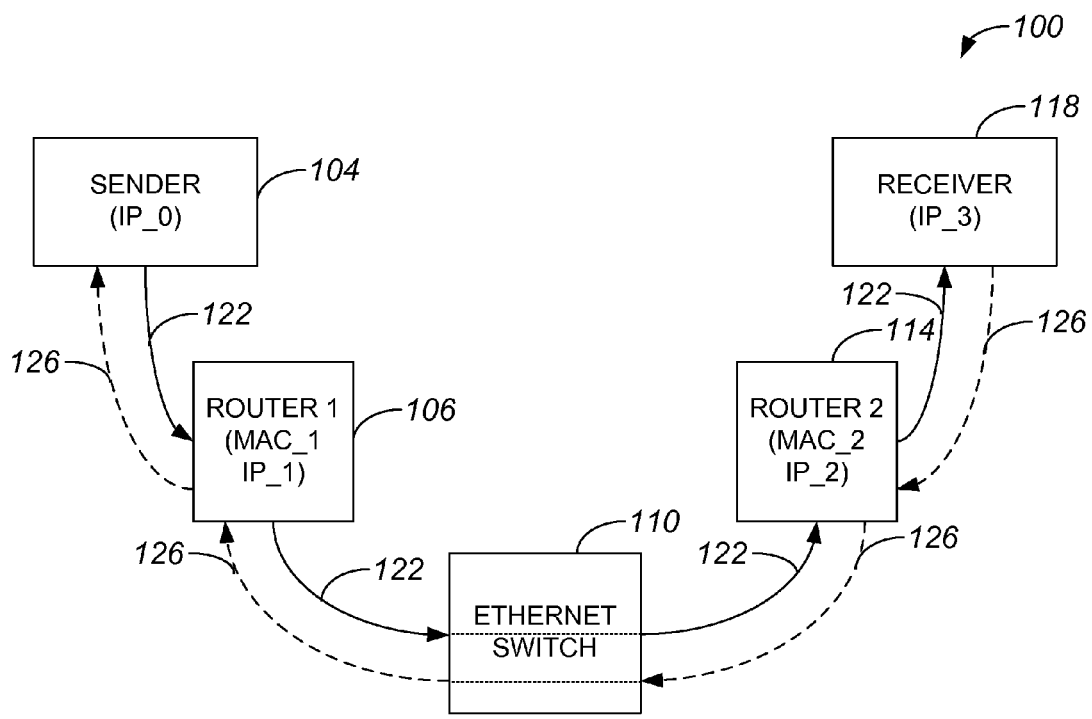
FIG. 1 is a block diagram representation of a network with resource reservation protocol (RSVP) capable network elements and an Ethernet switch, in which a resource reservation is to be made.
Figure 2A:
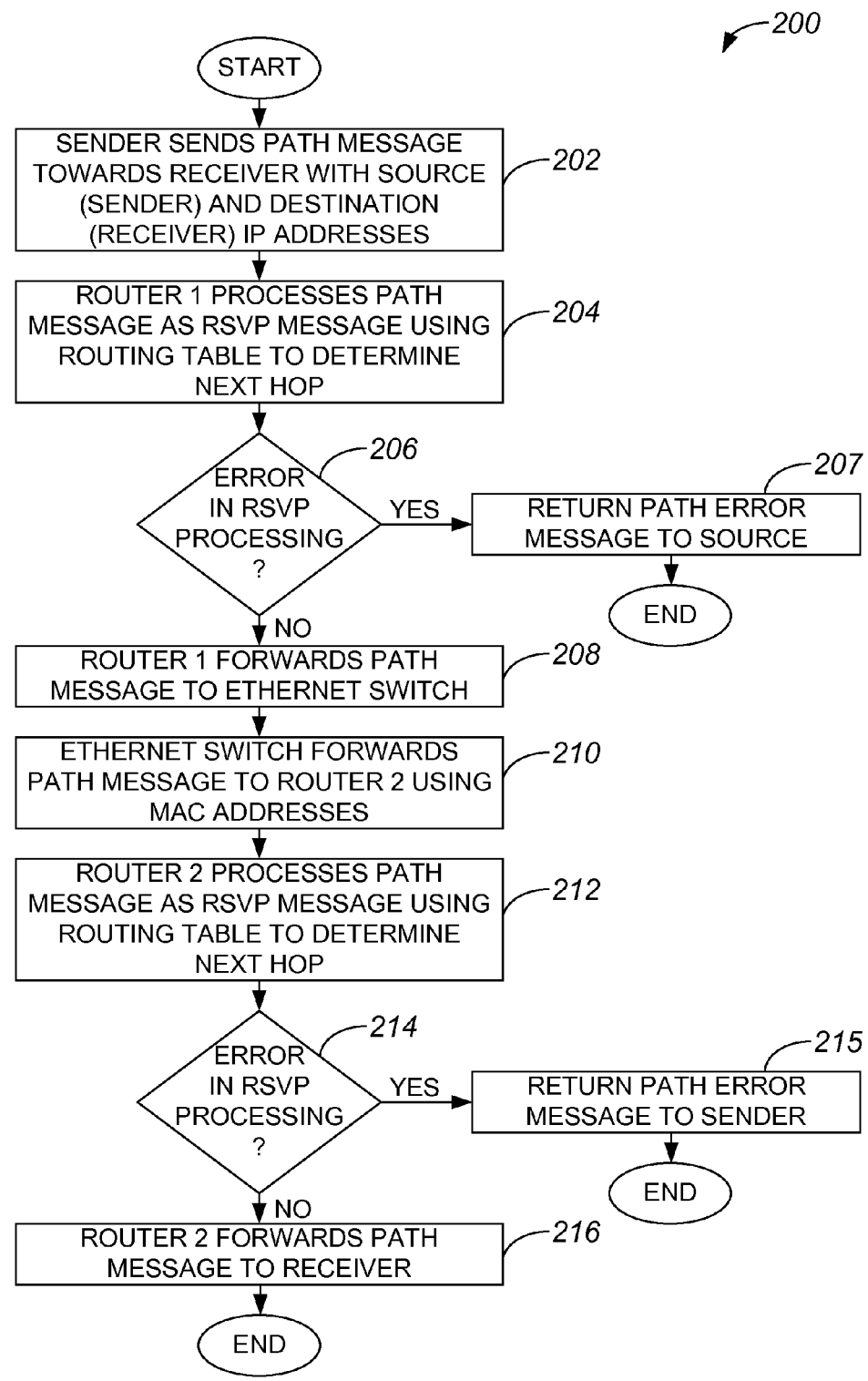
FIG. 2A is a process flow diagram which illustrates a method of processing a path (PATH) message.
Figure 2B:
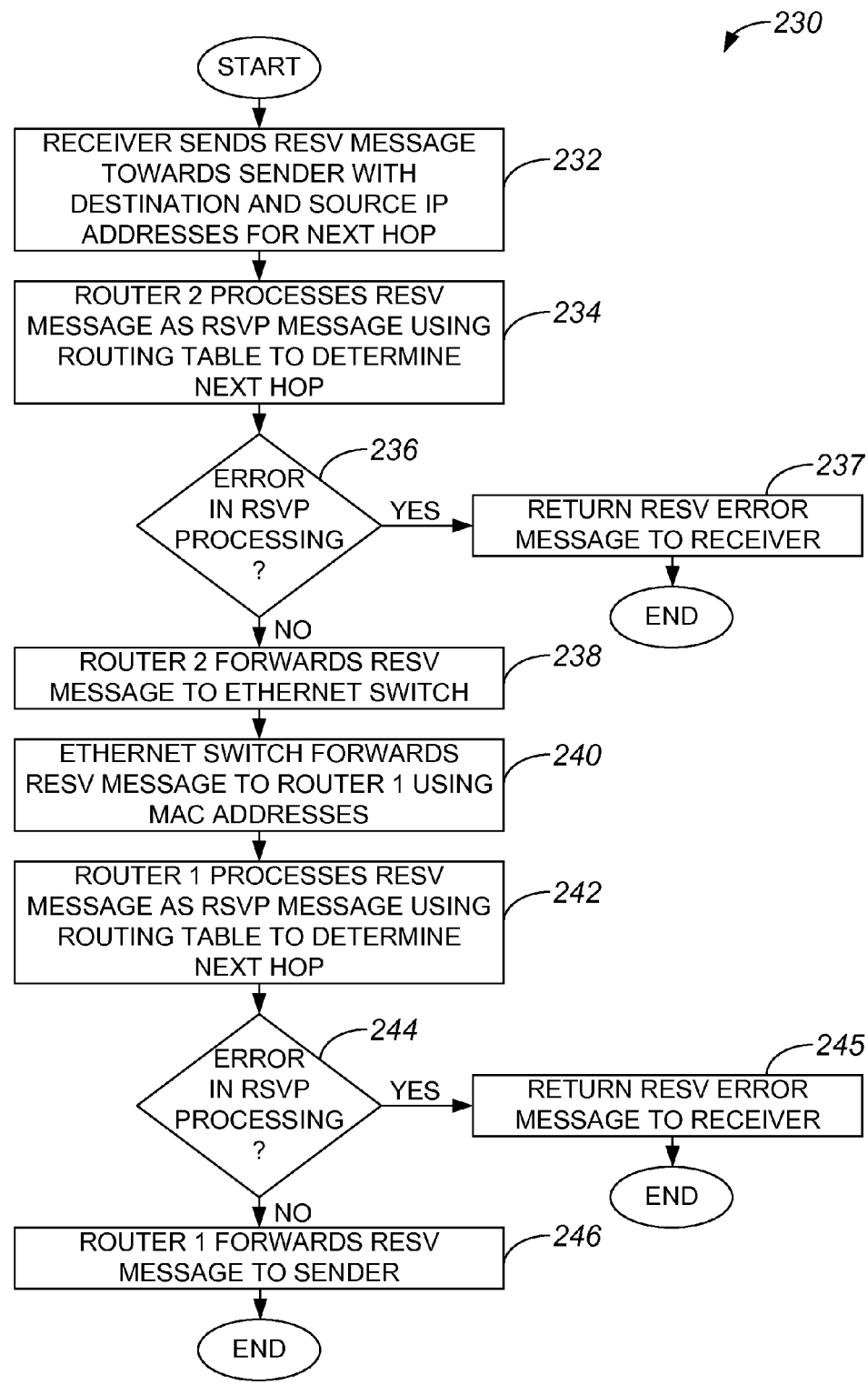
FIG. 2B is a process flow diagram which illustrates a method of processing a reservation (RESV) message.

Providing on-path signaling and on-path admission control for devices at layer 2 of an Open Systems Interconnection (OSI) reference model would increase the efficiency with which an overall network may operate. Providing on-path admission control and, hence, reserving resources associated with a layer 2 device, e.g., an Ethernet switch, that is located in a path between layer 3 hops of device, e.g., internet protocol (IP) routers, increases the Quality of Service (QoS) provided by a network. A network with layer 2 devices that provide on-path signaling and on-path admission control may provide substantially increased bandwidth efficiency in suitable networks such as enterprise or service provider networks that support voice or video applications.

In one embodiment, on-path signaling and on-path admission control is provided through an on-path IP reservation protocol such as a resource reservation protocol (RSVP). Although RSVP is described, it should be understood that RSVP is just one example of an on-path IP reservation protocol. If a protocol such as RSVP may be supported by layer 2 devices or in layer 2 networks such as Ethernet networks substantially without requiring IP forwarding functionality in the layer 2 devices or in layer 2 networks, the implementation and administration of the layer 2 devices or the layer 2 network may be relatively uncomplicated as well as more scaleable. Allowing RSVP to be supported for on-path signaling in a layer 2 environment extends the ability to reserve resources in an overall network. More generally, allowing substantially any on-path IP reservation protocol to be supported for on-path signaling in a layer 2 environment allows for the extended ability to reserve resources.

Generally, routing at an IP level may be either asymmetric or symmetric. Forwarding in a layer 2 network may be based on a bridge learning algorithm combined with the Spanning Tree Protocol (STP). The bridge learning algorithm uses a source media access control (MAC) address of an Ethernet frame arriving at an interface to determine which interface a frame with the same destination MAC address may be forwarded on. As will be appreciated by those skilled in the art, the Spanning Tree Protocol is used in switched networks to prevent forwarding loops. That is, the Spanning Tree Protocol effectively ensures a loop free topology by putting some links into the blocking state and hence constraining the interfaces that use bridge learning. The Spanning Tree Protocol ensures symmetric forwarding behavior. Therefore, while reservation (RESV) messages generated in response to path (PATH) messages are forwarded hop-by-hop at layer 3 of the OSI reference model using path state information set up by the PATH message to effectively force the RESV messages to follow the reverse path of their corresponding PATH messages and data packets, in a layer 2 network MAC layer forwarding based on bridge learning algorithms constrained by the Spanning Tree Protocol, RESV messages will substantially automatically follow the same path as their corresponding PATH messages and data packets at layer 2. As RESV messages will follow the same path as their corresponding PATH messages and data packets a layer 2, there is effectively no need to rely on path state information to route the RESV messages hop-by-hop at layer 2. Hence, with the Spanning Tree Protocol used with respect to layer 2 forwarding, a layer 2 switch or network, e.g., an Ethernet aggregation network, that is positioned in a path substantially between two layer 3 devices is also on the path that will be followed by PATH and RESV messages between the layer 3 devices. As such, if the layer 2 device snoops RSVP messages it may "see" all the RSVP messages associated with a data flow transiting through itself in steady state. In other words, a layer 2 device may effectively see substantially all PATH, RESV, and other RSVP messages associated with the reservation for a flow transiting through itself.

The ability to identify RSVP messages may be provided in a layer 2 device through the implementation of a classification mechanism that essentially looks inside a layer 2 frame. For example, a classification mechanism may intercept layer 2 frames containing an IP packet with a protocol identifier that indicates RSVP. The RSVP messages intercepted by the classification mechanism may then be handed over to a local RSVP processing agent that processes RSVP messages. The RSVP processing agent allows the layer 2 device to interpret and to forward an RSVP message, as well as to generate error messages when appropriate, e.g., in the case of an admission control rejection by the layer 2 device.

Figure 3A:
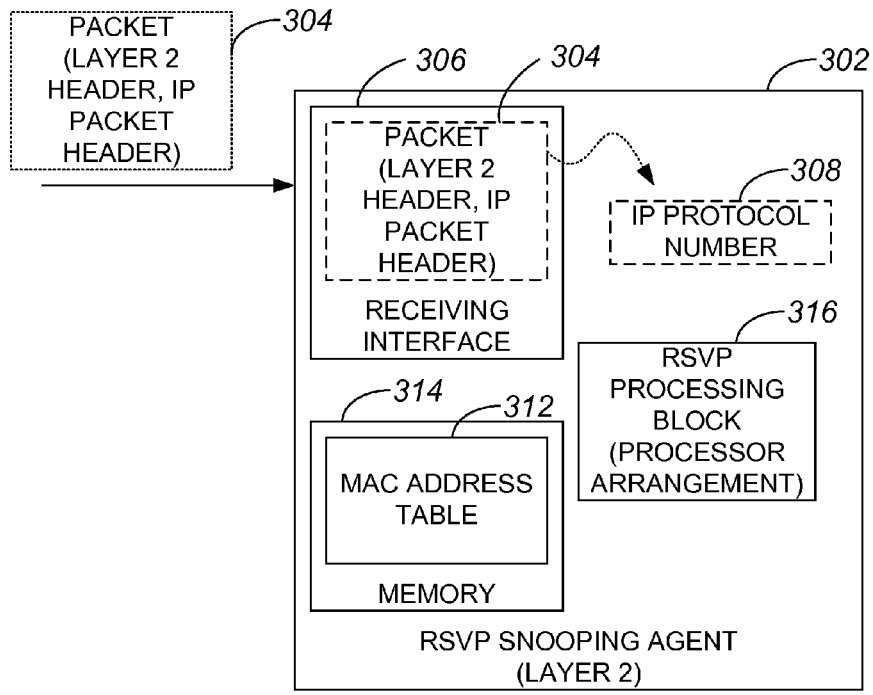
FIG. 3A is a block diagram representation of a layer 2 network element which is capable of processing RSVP packets in accordance with an embodiment of the present invention.

A layer 2 device which has the capability to identify and process RSVP messages will be described with reference to FIG. 3A FIG. 3A is a block diagram representation of a layer 2 device with RSVP processing capabilities, i.e., a RSVP snooping agent, in accordance with an embodiment of the present invention. A RSVP snooping agent 302 is arranged to receive a packet 304. Packet 304, which will be described below with reference to FIG. 3B, includes a layer 2 header that contains information such as MAC addresses of a sender of packet 304 and an intended receiver of packet 304. Packet 304 also includes an IP header that includes an IP protocol number, as well as IP address of a sender of packet 304 and a receiver of packet 304.

When RSVP snooping agent 302 receives packet 304 on a receiving interface 306, RSVP snooping agent 302 may access the IP packet header in packet 304 to identify an IP protocol number 308. If packet 304 is part of a RSVP message, IP protocol number 308 will indicate that RSVP is the protocol associated with packet 304. In general, IP protocol number 308 is IP protocol number 46 when packet 304 carries an RSVP message. A RSVP processing block 316 of RSVP snooping agent 316 may identify IP protocol number 308, and may effectively process packet 304. Processing packet 304 may include determining whether RSVP snooping agent 302 has sufficient resources that may be utilized to receive and to forward RSVP messages.

As a part of processing packet 304, RSVP processing block 316 may also access a MAC address table 312 stored in a memory 314 to identify a next hop to which packet 304 may be forwarded. RSVP snooping agent 302 is generally not arranged to perform IP forwarding, and therefore may not utilize a routing table to forward or route packet 304. MAC address table 312 is used by RSVP snooping agent 302 to, using MAC addresses associated with packet 304, identify an appropriate interface and virtual local area network (VLAN) for use in forwarding packet 304 towards its intended receiver.

Figure 3B:
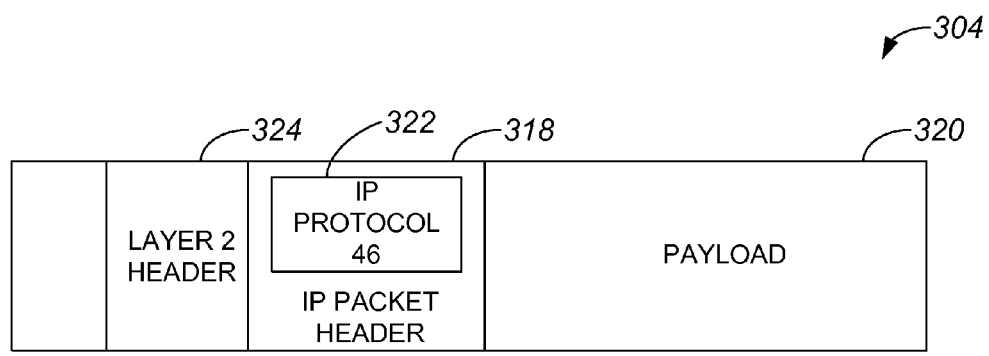
FIG. 3B is a diagrammatic representation of a RSVP packet, e.g., RSVP packet 304 of FIG. 3A.

FIG. 3B is a representation of a packet, i.e., packet 304 of FIG. 3A, that may be processed by a RSVP snooping agent, i.e., RSVP snooping agent 302 of FIG. 3A, in accordance with an embodiment of the present invention. Packet 304 includes a payload area 320 that is arranged to contain data. Packet 304 also includes layer 2 header 324 is arranged to contain information such as MAC addresses and an IP packet header 318. IP packet header 318 contains IP addresses and an IP protocol number 322 that indicates, in the described embodiment, that packet 304 is associated with a RSVP message.

Figure 4A:
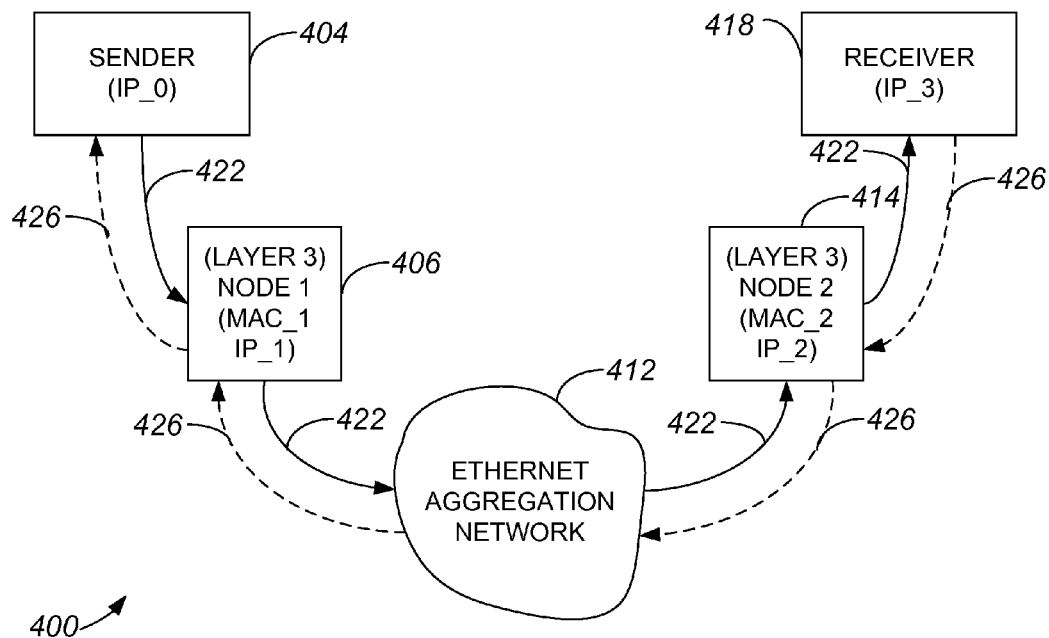
FIG. 4A is a diagrammatic representation of a network with RSVP capable network elements and an Ethernet aggregation network in which a resource reservation is to be made.

RSVP snooping agents such as RSVP snooping agent 302 of FIG. 3A may generally be layer 2 devices, e.g., Ethernet bridges or switches. Such RSVP snooping agents may be located individually along a path between IP hops, or in a network that is traversed by a path between IP hops. In other words, a single RSVP snooping agent may be included between two layer 3 or RSVP capable network elements, or a network of RSVP snooping agents may be included between two layer 3 network elements. With reference to FIG. 4A, an overall network that includes RSVP capable network elements and a network of layer 2 elements in which a resource reservation is to be made will be described in accordance with an embodiment of the present invention. A network 400 includes a sender SRC 404 and a receiver DST 418. Sender SRC 404 is arranged to initiate a PATH message 422 that is to be forwarded towards receiver DST 418. In response to PATH message 422, receiver DST 418 initiates a RESV message 426 that is to be forwarded to sender SRC 404 hop-by-hop.

When PATH message 422 is sent towards receiver DST 418, PATH message is provided to a first node 406 which is a layer 3 node with RSVP processing capabilities. First node 406 forwards PATH message 422 to network 412 which, in the described embodiment, is an Ethernet aggregation network. As will be described below with respect to FIG. 4B, network 412 includes a plurality of RSVP snooping agents.

Network 412 processes PATH message 422, and forwards PATH message 422 to a second node 414 or a second hop. Processing PATH message 422 within network 412 may include forwarding PATH message 422 through different snooping agents in network 412 using MAC address tables of the different snooping agents. Second node 414, which may be a second router, updates MAC addresses in PATH message 406 as appropriate and forwards PATH message 406 to receiver DST 418.

RESV message 426 follows the reverse path of PATH message 422 within overall network 400 and within network 412, as layer 2 path within network 412 is based on the Spanning Tree Protocol in the described embodiment. Hence, nodes 406, 414 are arranged to update MAC addresses in RESV message 426, while snooping agents within network 412 are arranged to perform RSVP processing on RESV message 426, but are not arranged to update MAC addresses in RESV message 426.

Figure 4B:
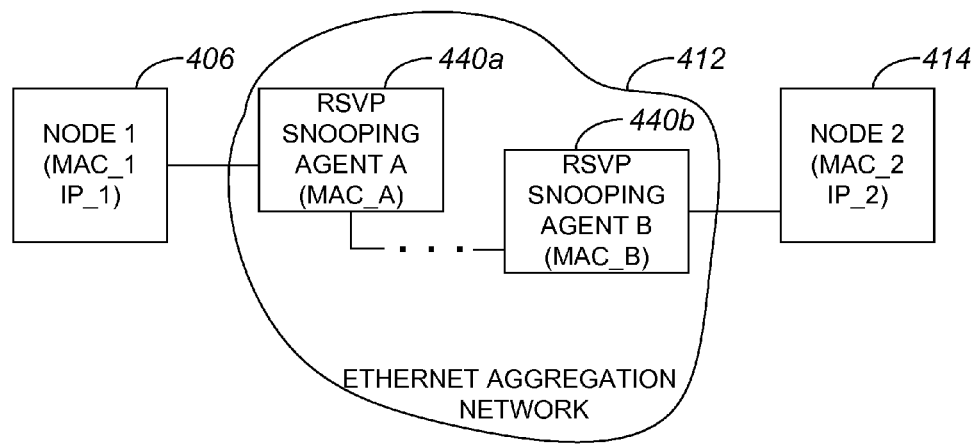
FIG. 4B is a diagrammatic representation of layer 2 agents in an Ethernet aggregation network, e.g., Ethernet aggregation network 412 of FIG. 4A, that are arranged to use RSVP information for on-path signaling in accordance with an embodiment of the present invention.

FIG. 4B is a representation of snooping agents within a network 412 in accordance with an embodiment of the present invention. Network 412 includes RSVP snooping agent A 440*a* and RSVP snooping agent B 440*b*. RSVP snooping agent A 440*a* is arranged to receive a PATH message substantially directly from first node 406 and to forward a RESV message substantially directly to first node 406, while RSVP snooping agent B 440*b* is arranged to receive a RESV message substantially directly from second node 414 and to forward a PATH message substantially directly to second node 414. Any number of snooping agents may generally be included in network 412. In the described embodiment, however, two snooping agents 440*a*, 440*b* are included in network 412.

Nodes 406, 414 are border nodes or routers in that nodes 406, 414 border network 412. It should be appreciated that although network 412 is described as being an Ethernet aggregation network, network 412 may be substantially any layer 2 network. Herein and after, for ease of discussion, nodes 406, 414 will generally be referred to as routers. However, nodes 406, 414 are not limited to being routers and may be substantially any layer 3 network element.

Router 406 is arranged to cause MAC address tables (not shown) within snooping agents 440a, 440b to be updated by sending an address resolution protocol (ARP) message through Ethernet aggregation network 412. Updating the MAC address tables, as per regular Ethernet bridging MAC learning mechanisms, within layer 2 switches that support RSVP snooping agents 440a, 440b allows snooping agents 440a, 440b to update their MAC layer forwarding tables using standard Ethernet bridge learning algorithms. Hence, appropriate VLANs and forwarding interfaces to be used to forward an RSVP message towards an appropriate destination for the RSVP message may be accurately determined. Typically, router 406 initiates an ARP message when a PATH message is to be sent to network 412. Router 414 generally does not initiate an ARP message when a RESV message is to be sent to network 412, as a previous ARP message sent by router 406 in response to a PATH message has already caused MAC address tables to be updated.

If a MAC address table (not shown) of snooping agent A 440a is not updated before an RSVP message arrives, the RSVP message may be flooded out of substantially all interfaces associated with a VLAN, thereby causing the RSVP message to be forwarded to nodes (not shown) which are not in a path between sender SRC 404 and receiver DST 418 of FIG. 4A. While this is generally not a concern, because the RSVP states on invalid paths will eventually time out, it is undesirable as it may unnecessarily tie up resources. Hence, as discussed above, before router 406 provides an RSVP message, i.e., a PATH message, to snooping agent A 440a, router 406 may send an ARP message for the MAC address of the next hop IP address, i.e., the IP address of router 414. As a result of the ARP message being sent by router 406, the MAC address tables in the layer 2 devices supporting the RSVP snooping agents 440a, 440b may be updated. Ensuring that the MAC address tables of the layer 2 switches supporting the RSVP snooping agents 440a, 440b in network 412 are correctly populated effectively prevents flooding of a message once the message is forwarded by a border router 406, 414 through network 412.

Figure 4C:
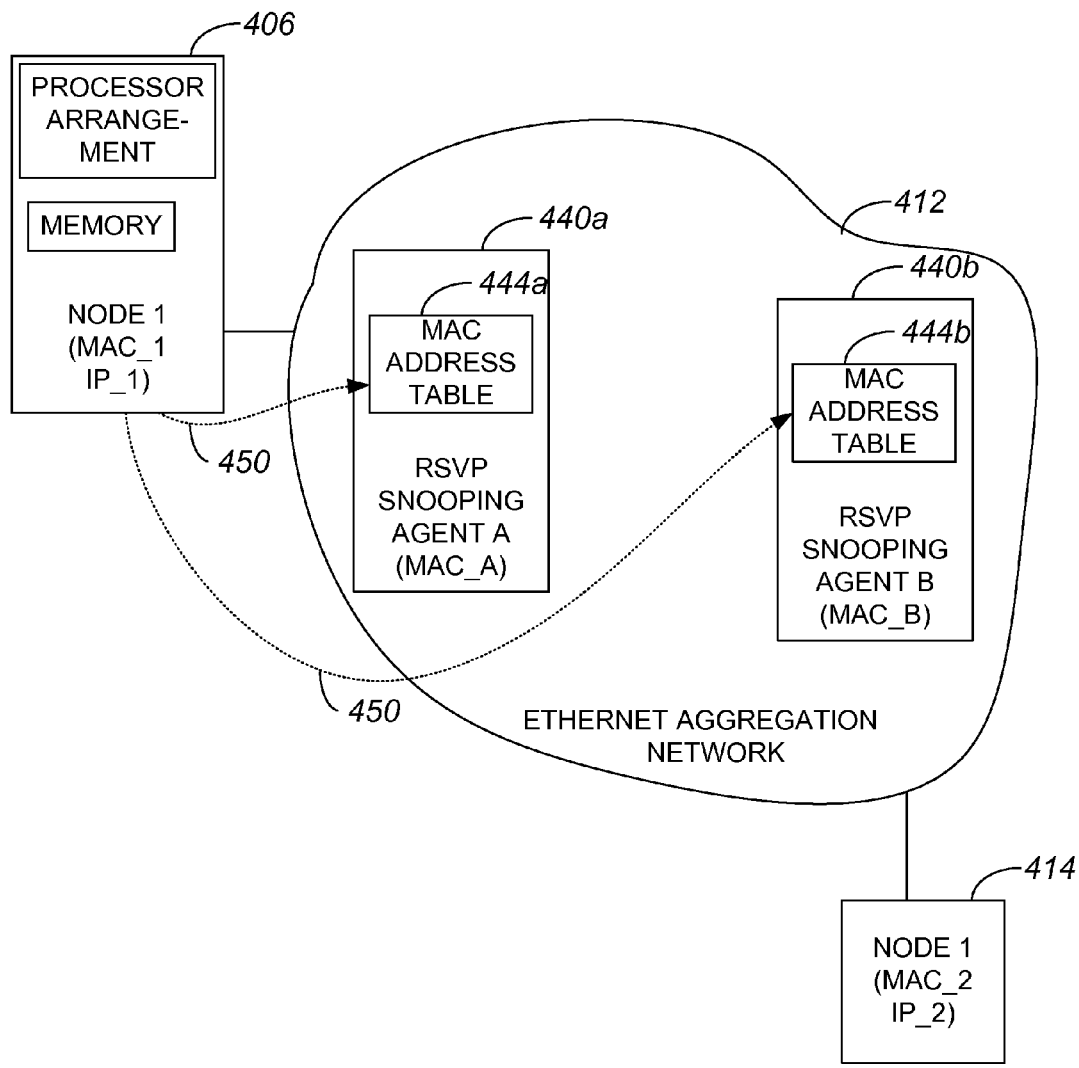
FIG. 4C is a diagrammatic representation of a RSVP capable node, e.g., node '1' 406 of FIG. 4A, performing an address resolution protocol (ARP) message to update (media access control) MAC address tables in layer 2 agents of an Ethernet aggregation network e.g., Ethernet aggregation network 412 of FIG. 4A, in accordance with an embodiment of the present invention.

Referring next to FIG. 4C, the initiation of an ARP message by router 406 will be described in accordance with an embodiment of the present invention. Router 406 effectively sends an ARP message 450 for the MAC address of router 414. ARP message 450 typically includes a field describing the message type and a field containing address information. In general, ARP message 450, when targeted to router 414, causes MAC address tables 444a, 444b to be updated or otherwise refreshed.

It should be appreciated that although ARP message 450 may generally be sent each time router 406 is to forward a PATH message via network 412, ARP message 450 may not necessarily be sent each time router 406 intends to forward a PATH message. By way of example, if reducing the number of ARP messages sent by router 406 is desired or if scaling is to be improved within a network, ARP message 450 may be sent only in some instances. In one embodiment, ARP message 450 may be sent when a PATH message is to be forwarded substantially only if the Spanning Tree Protocol Topology Change Notification (TCN) message is detected by router 406. Alternatively, ARP message 450 may be sent substantially only if it is determined that an age of entries in a MAC address table is less than a configurable amount, indicating that a topology change may have occurred recently.

Figure 5A:
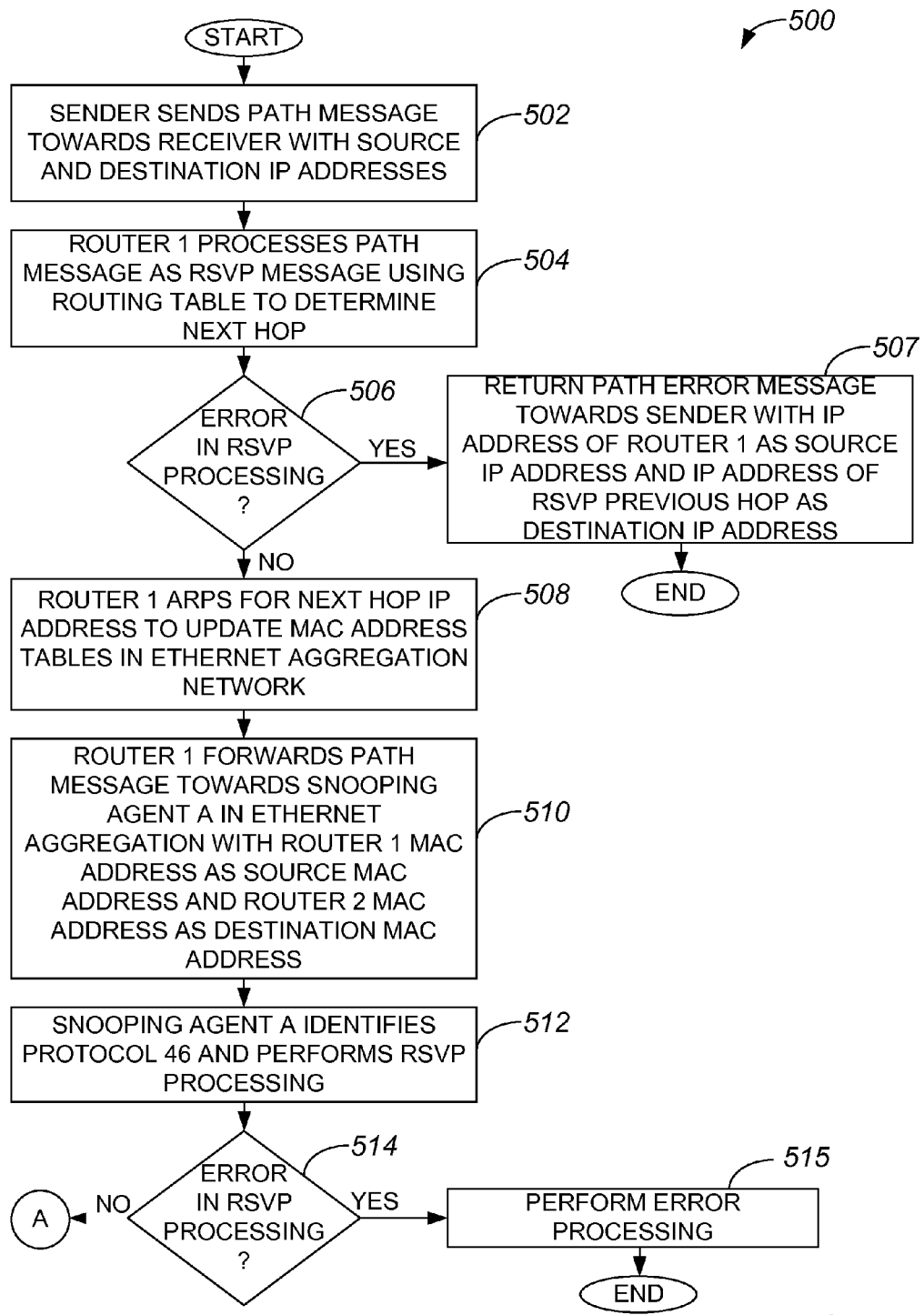
FIGS. 5A-5C are a process flow diagram which illustrates one method of processing a PATH message in a network with layer 2 agents that are arranged to use RSVP information for on-path signaling in accordance with an embodiment of the present invention.
Figure 5B:
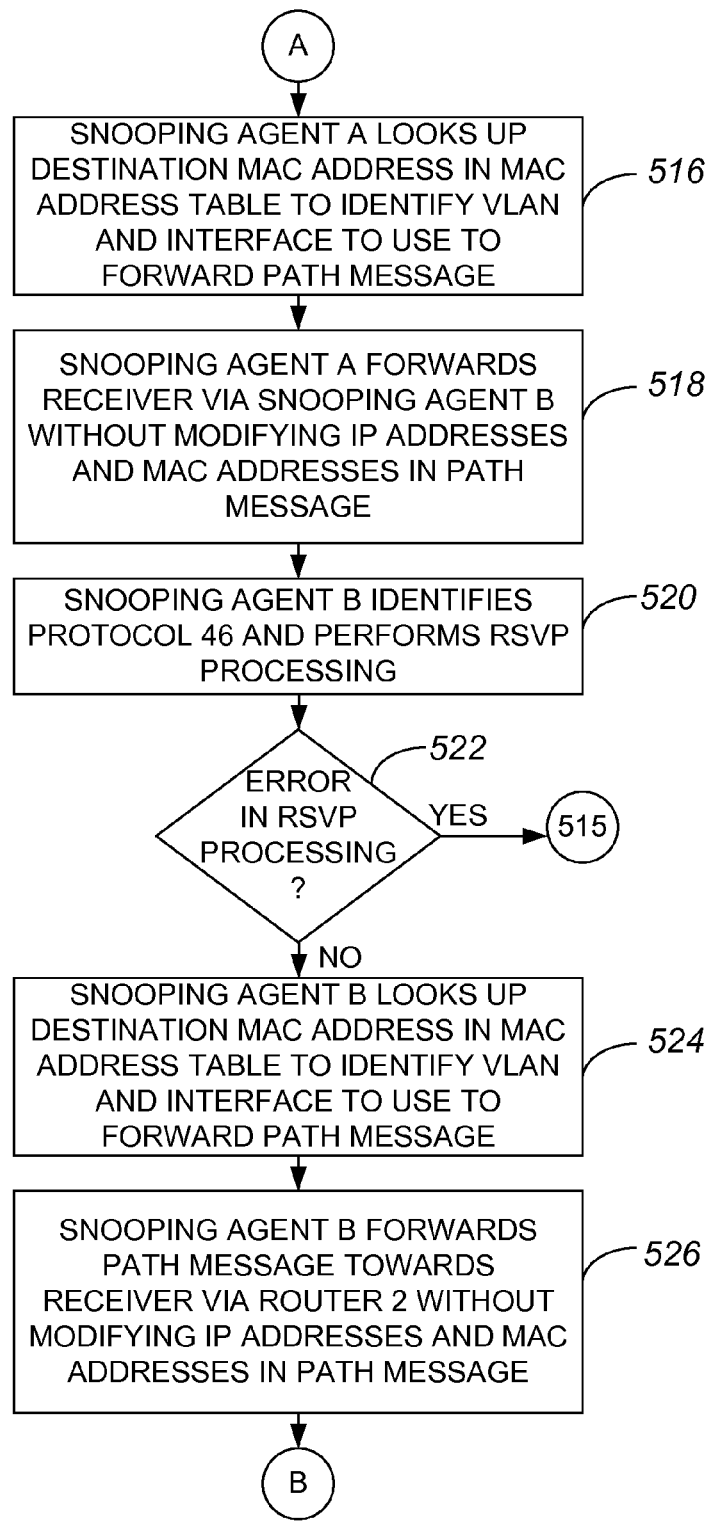
Figure 5C:
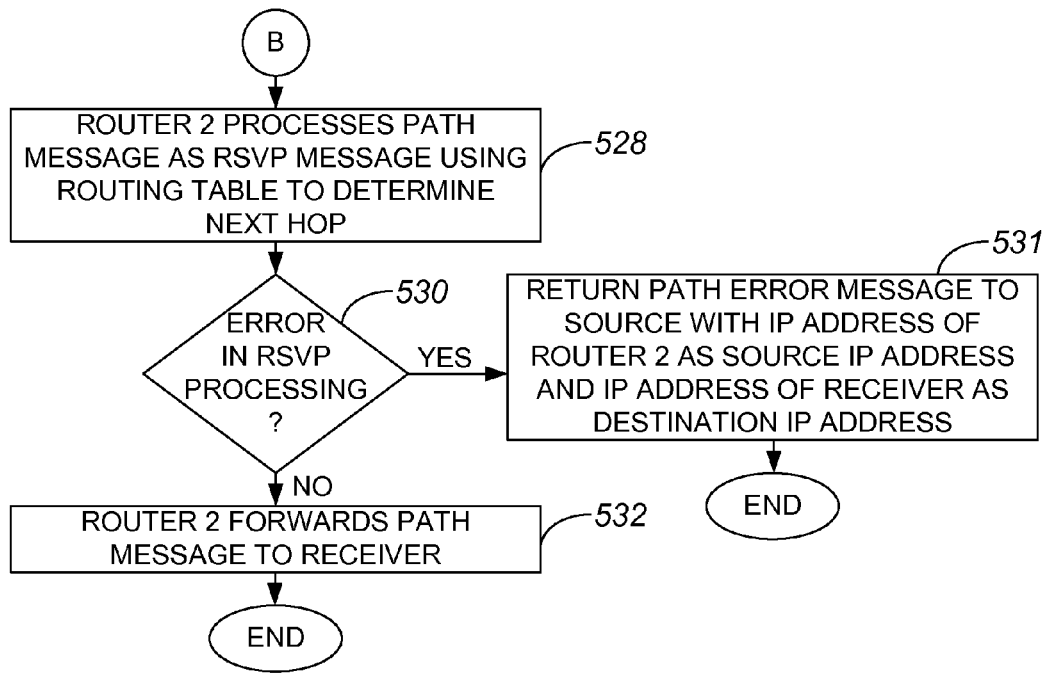

Each node or network element of a path between a sender and a receiver may perform RSVP processing, regardless of whether the node is a layer 3 node or a layer 2 node. FIGS. 5A-5C are a process flow diagram which illustrates one method of processing a PATH message in a network with layer 2 agents that are arranged to use RSVP information for on-path signaling in accordance with an embodiment of the present invention. Processing a PATH message generally entails establishing path states. In the described embodiment, the network is network 400 of FIG. 4A. A method 500 of processing a PATH message in a network begins at step 502 in which a sender SRC sends a PATH message towards a receiver DST with source and destination IP addresses. In the described embodiment, the sender SRC is sender SRC 404 of FIG. 4A which has an IP address of IP_0, and the receiver DST is receiver DST 418 of FIG. 4A which has an IP address of IP_3. The PATH message is received and processed by router '1' in step 502. Router '1', e.g., node 406 of FIG. 4A, processes the PATH message as an RSVP message using a routing table to determine the next hop in a path between the sender SRC and the receiver DST. RSVP PATH message processing is typically initiated by a RSVP function in router '1' when the Router Alert IP Option is detected in the IP Header and protocol 46 is detected in a header of the RSVP message.

Router '1' is aware that in the path between router '1' and router '2', a layer 2 network that supports RSVP snooping is present. More specifically, with respect to FIG. 4A, node 406 and node 414 are aware that network 412 supports RSVP snooping. Referring back to FIG. 5A, a determination is made in step 506 regarding whether an error has arisen in the course of RSVP processing. An error may arise for any number of reasons which include, but are not limited to, a lack of an available route between router '1' and the destination.

If the determination in step 506 is that an error has arisen as a result of RSVP processing, the indication is that the PATH message may not be sent to the destination specified by the destination IP address in the PATH message. Accordingly, in step 507, a PATH error (PATH_ERR) message is returned towards the sender SRC by router '1'. The PATH_ERR message includes the IP address of router '1' as a source IP address that identifies the source of the PATH_ERR message, and the IP address of the RSVP previous hop as the destination of the PATH_ERR message. Once the PATH_ERR message is sent to the Sender SRC, the processing of a PATH message is completed.

Alternatively, if the determination in step 506 is that an error has not occurred during the course of RSVP processing by router '1', then router '1' sends an ARP message, or "arps," in step 508 for the next hop IP address in a path. Arping for the next hop IP address causes the MAC address tables of the devices, e.g., switches, in an Ethernet aggregation network to be updated such that the MAC address tables are correctly populated. After router '1' arps for the next hop IP address, router '1' forwards the PATH towards router '2' and, hence, to snooping agent 'A' in the Ethernet aggregation network, e.g., snooping agent 'A' 440a of FIG. 4B, in step 510. The PATH message is forwarded with a source MAC address specified as the MAC address of router '1' and a destination MAC address specified as the MAC address of router '2', the border router on the other side of the Ethernet aggregation network. It should be appreciated that the source IP address of the PATH message remains the IP address of the Sender SRC and the destination IP address of the PATH message remains the IP address of the receiver DST.

After receiving the PATH message from router '1', snooping agent 'A' identifies the PATH message in step 512 by looking at a header associated with the PATH message, i.e., an IP packet header, and identifying protocol 46. Upon identifying the PATH message, snooping agent 'A' performs RSVP processing, which may include updating the PATH message with information on the characteristics of the path, such as delay. Once RSVP processing is performed, it is determined in step 514 whether an error has occurred during RSVP processing. If an error has occurred, e.g., if there is an admission control failure, error processing is performed in step 515. Methods for performing error processing will be described below with reference to FIGS. 6A-6C.

If it is determined in step 514 that an error has not occurred, snooping agent 'A' looks up the destination MAC address specified in the Ethernet frame containing the PATH message using a MAC address table in step 516. Looking up the destination MAC address in the MAC address table of a device that includes snooping agent 'A' allows snooping agent 'A' to identify a VLAN and an outbound interface to use to forward the PATH message towards the receiver DST. In the described embodiment, the destination MAC address is the MAC address of router '2'.

Snooping agent 'A' forwards the PATH message towards the destination in step 518 without modifying IP addresses or MAC addresses specified in the PATH message. In the described embodiment, snooping agent 'B', i.e., snooping agent B 440b of FIG. 4B, is in the path between snooping agent 'A' and router '2'. Hence, the PATH message is forwarded by snooping agent 'A' to snooping agent 'B' en route to router '2'. After snooping agent 'B' receives the PATH message, snooping agent 'B' identifies the protocol of the PATH message as being protocol 46, and performs RSVP processing in step 520.

It is determined in step 522 whether an error has arisen during the course of the RSVP processing by snooping agent 'B'. If it is determined that an error has arisen, process flow returns to step 515 in which error processing is performed. As previously mentioned, the steps associated with various methods of performing error processing will be described below with respect to FIGS. 6A-6C. On the other hand, if it is determined in step 522 that RSVP processing has not resulted in an error, then snooping agent 'B' looks up the destination MAC address in a MAC address table of the device that contains snooping agent 'B' to identify an appropriate VLAN and interface to use to forward the PATH message in step 524. From step 524, process flow proceeds to step 526 in which snooping agent 'B' forwards the PATH message towards the receiver DST via router '2' without altering the IP addresses and MAC addresses specified in the PATH message. When router '2' receives the PATH message, router '2' processes the PATH message as an RSVP message in step 528. Processing the PATH message as an RSVP message includes accessing a routing table to determine the next hop to reach the receiver DST. In the described embodiment, the receiver DST is the next hop. It should be appreciated, however, that there may generally be any number of hops between a border router such as router '2' and the receiver DST.

In step 530, it is determined whether an error has resulted from the RSVP processing performed by router '2'. If it is determined that no error has occurred, router '2' forwards the PATH message to the receiver DST in step 532. Alternatively, if it is determined in step 530 that an error has occurred, then a PATH_ERR message is generated and transmitted towards the Sender SRC by router '2' in step 532. The PATH_ERR message is sent towards the Sender SRC with a source IP address set as the IP address of router '2' and a destination address set as the RSVP Previous hop which is the IP address of router '1'. The source MAC address in the PATH_ERR message is set to the MAC address of router '2', while the destination MAC address in the PATH_ERR message is set to the MAC address of router '1'. The processing of a PATH message is completed after the PATH_ERR message is sent.

Figure 6A:
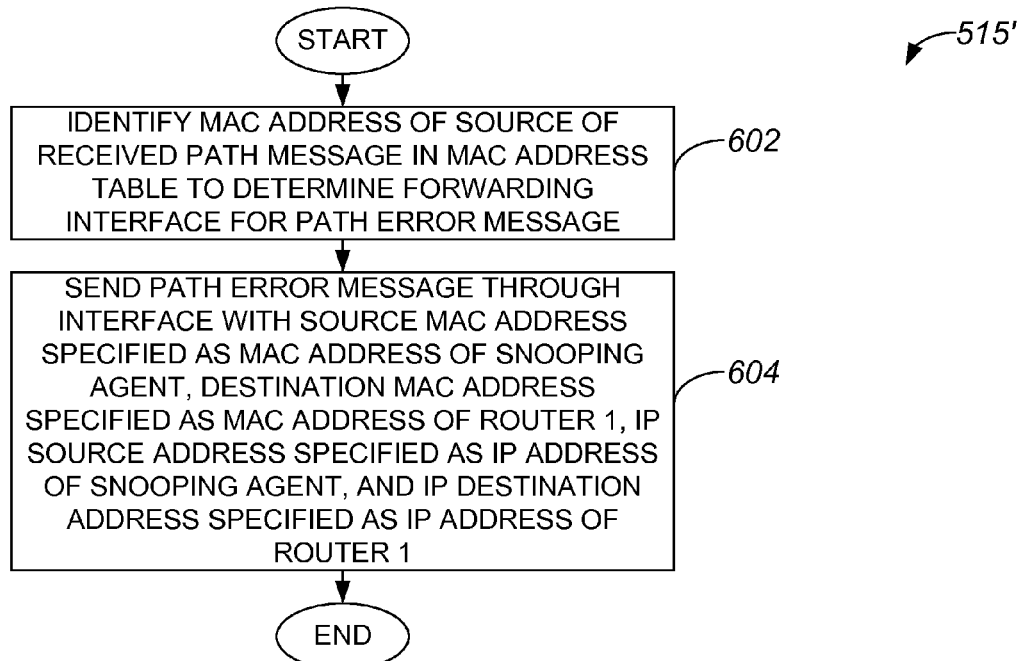
FIG. 6A is a process flow diagram which illustrates a first method of performing error processing in response to a PATH message at a layer 2 agent that is arranged to use RSVP information for on-path signaling, i.e., step 515 of FIG. 5A, in accordance with an embodiment of the present invention.

As mentioned above, the error processing methods used by snooping agents, or layer 2 nodes which are capable of RSVP snooping, may vary. In other words, different methods may be associated with step 515 of FIG. 5A. The method used to process errors may depend upon whether the snooping agent has an IP address and, hence, some IP host functionality, for example. With reference to FIG. 6A, performing error processing using a snooping agent which has as IP address will be described in accordance with an embodiment of the present invention. A method 515' of processing an error begins at step 602 in which the snooping agent identifies the MAC address of the source of a received PATH message, and uses the MAC address to perform a look up in a MAC address table to determine a forwarding interface for a PATH_ERR message. The MAC address table of a device that includes the snooping agent is used to determine a forwarding interface, because the snooping agent is not running a routing protocol and, therefore, does not have a routing table. Once the forwarding interface is identified, a PATH_ERR message is sent through the forwarding interface in step 604. The PATH_ERR message is specified with the MAC address of the snooping agent as a source MAC address, and with the MAC address of router '1' as a destination MAC address. The source IP address of the PATH_ERR message may be specified as the IP address of the snooping agent, and the destination IP address of the PATH_ERR message may be specified as the IP address of router '1'. Upon sending the PATH_ERR message through the forwarding interface, the processing of an error is completed.

Figure 6B:
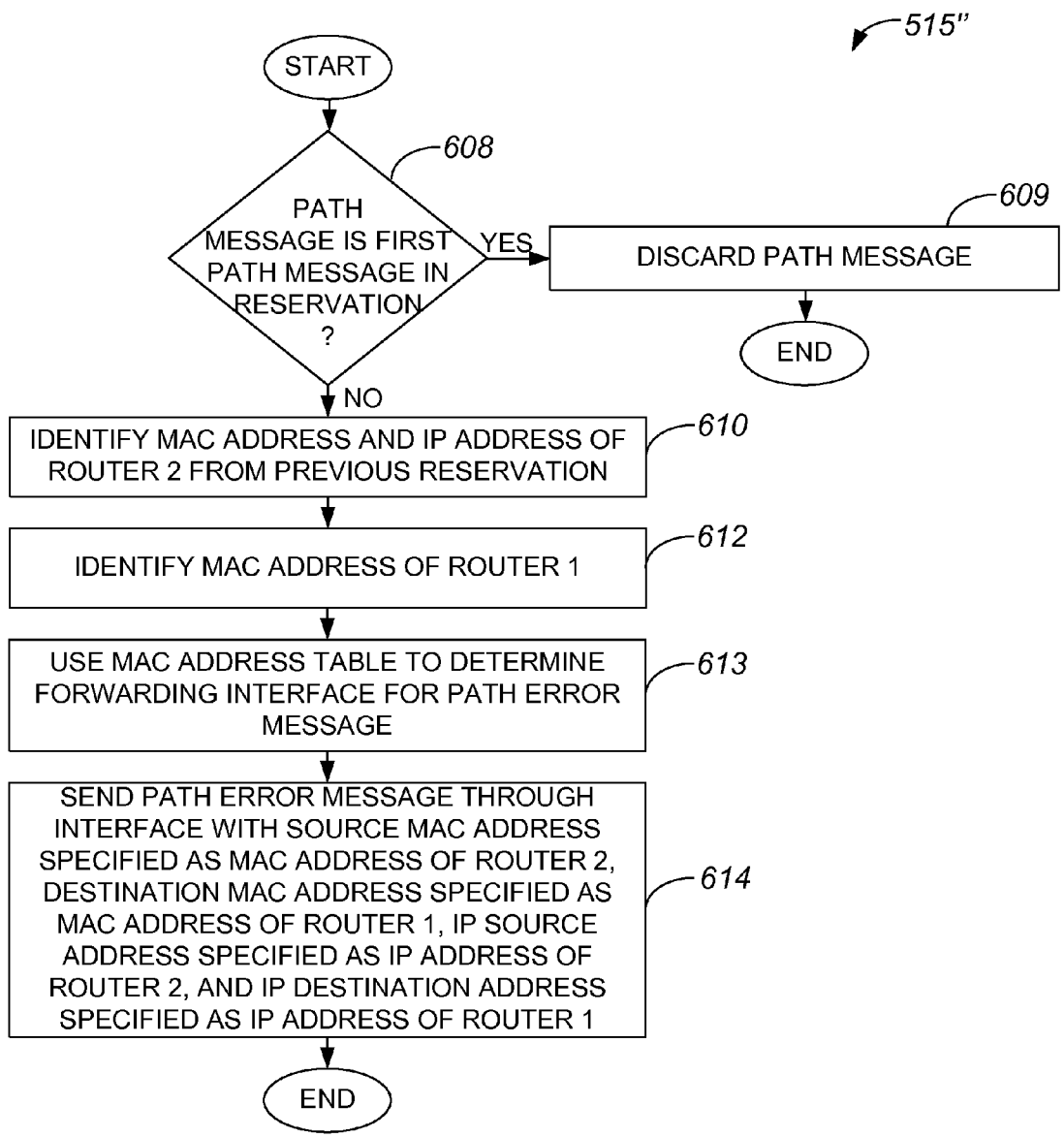
FIG. 6B is a process flow diagram which illustrates a second method of performing error processing in response to a PATH message at a layer 2 agent that is arranged to use RSVP information for on-path signaling, i.e., step 515 of FIG. 5A, in accordance with an embodiment of the present invention.

If a snooping agent does not have an IP address, the snooping agent may process an error depending on whether a PATH message is a first PATH message received in a reservation. FIG. 6B is a process flow diagram which illustrates another method of performing error processing in response to a PATH message at a snooping agent in accordance with an embodiment of the present invention. A method 515" of processing an error begins at step 608 in which it is determined if the PATH message is the first PATH message received as part of a reservation. If it is determined that the path message is the first PATH message in a reservation, the path message is discarded in step 609, and the processing of an error is completed. That is, the PATH message is dropped without sending a corresponding error message. It is anticipated that the Sender SRC of the PATH message would eventually be made aware of an error when the Sender SRC fails to receive either an error message or a RESV message in response to the PATH message after a predetermined amount of time.

Alternatively, if it is determined in step 608 that the PATH message is not the first PATH message in a reservation, the indication is that there is already an established reservation. Hence, the snooping agent has information relating to the IP address and the MAC address of router '2', and may return a PATH_ERR message to the sender SRC that appears to have been sent by router '2'. Accordingly, from step 608, process flow proceeds to step 610 in which the MAC address and the IP address of router '2' are identified from the RESV state maintained for the corresponding reservation.

Once the MAC address and the IP address of router '2' are identified, the MAC address of router '1' is determined in step 612, and the MAC address of router '1' is used to look up an appropriate forwarding interface for the PATH_ERR message in the MAC address table of the device that includes the snooping agent in step 613. Then, in step 614, the PATH_ERR message is sent through the forwarding interface. The PATH_ERR message has the MAC address of router '2' specified as the source MAC address, the IP address of router '2' specified both as the source IP address and as the RSVP Error Node address which identifies the node in which the error was detected, the MAC address of router '1' specified as the destination MAC address, and the IP address of router '1' specified as the destination IP address. After the PATH_ERR message is sent, the processing of an error is completed.

Figure 6C:
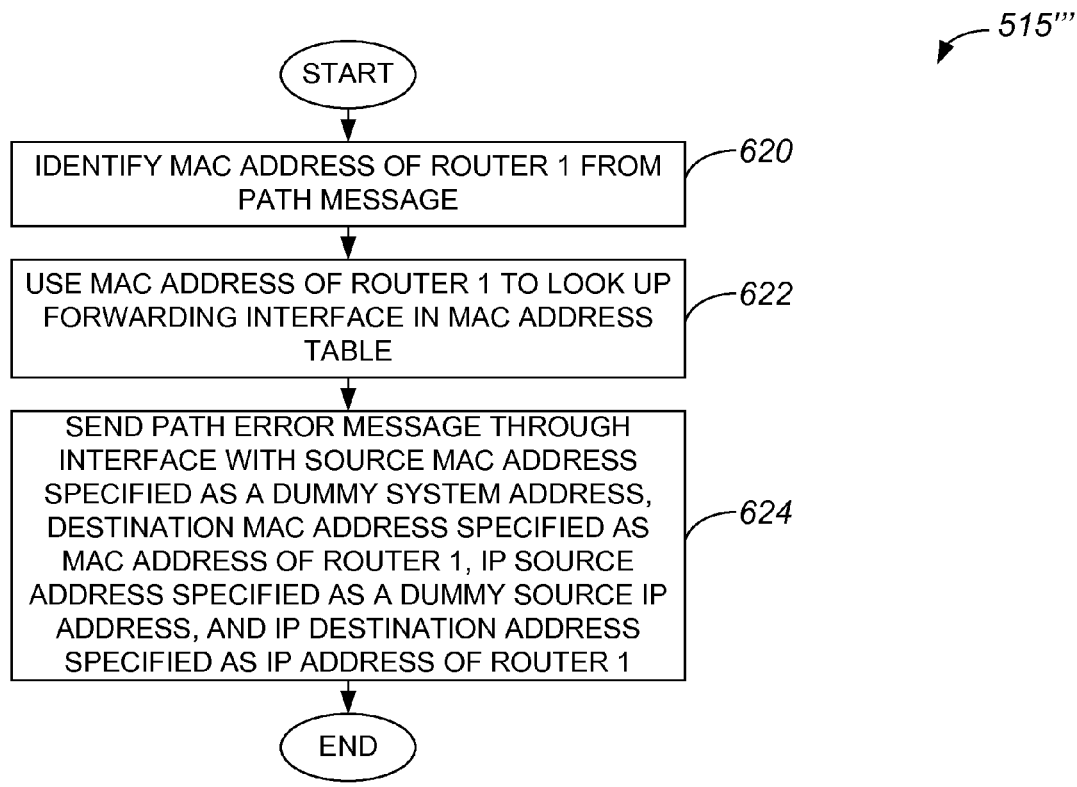
FIG. 6C is a process flow diagram which illustrates a third method of performing error processing in response to a PATH message at a layer 2 agent that is arranged to use RSVP information for on-path signaling, i.e., step 515 of FIG. 5A, in accordance with an embodiment of the present invention.

A snooping agent may specify dummy addresses as the source addresses of a PATH_ERR message. FIG. 6C is a process flow diagram which illustrates a method of performing error processing in which dummy addresses are specified in a PATH_ERR message in accordance with an embodiment of the present invention. A method 515''' of processing an error begins at step 620 in which the MAC address of router '1' is identified from the PATH message that was received by the snooping agent. The identified MAC address of router '1' is used to look up a forwarding interface to use in forwarding a PATH_ERR message in step 622. Once a forwarding interface is identified, a PATH_ERR message is sent through the forwarding interface in step 624 with a source MAC address and a source IP address each specified as a dummy address. It should be appreciated that the RSVP Error Node Address which identifies the node in which the error was detected may also be specified a dummy IP address. The destination MAC address in the PATH_ERR message is specified as the MAC address of router '1', and the destination IP address in the PATH_ERR message is specified as the IP address of router '1'. The processing of an error is completed after the PATH_ERR message is sent.

Figure 7A:
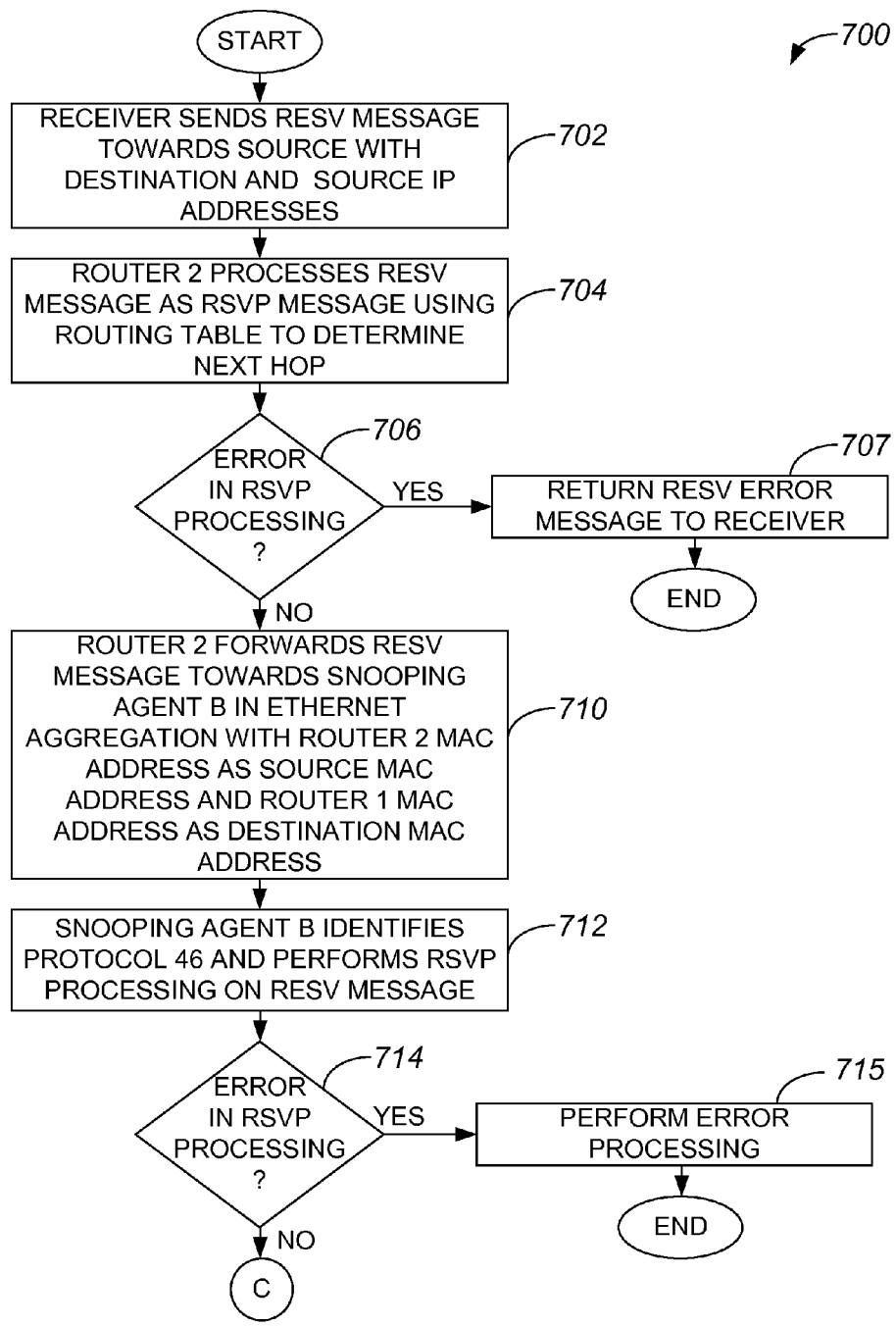
FIGS. 7A-7C are a process flow diagram which illustrates one method of processing a RESV message in a network with layer 2 agents that are arranged to use RSVP information for on-path signaling in accordance with an embodiment of the present invention.
Figure 7B:
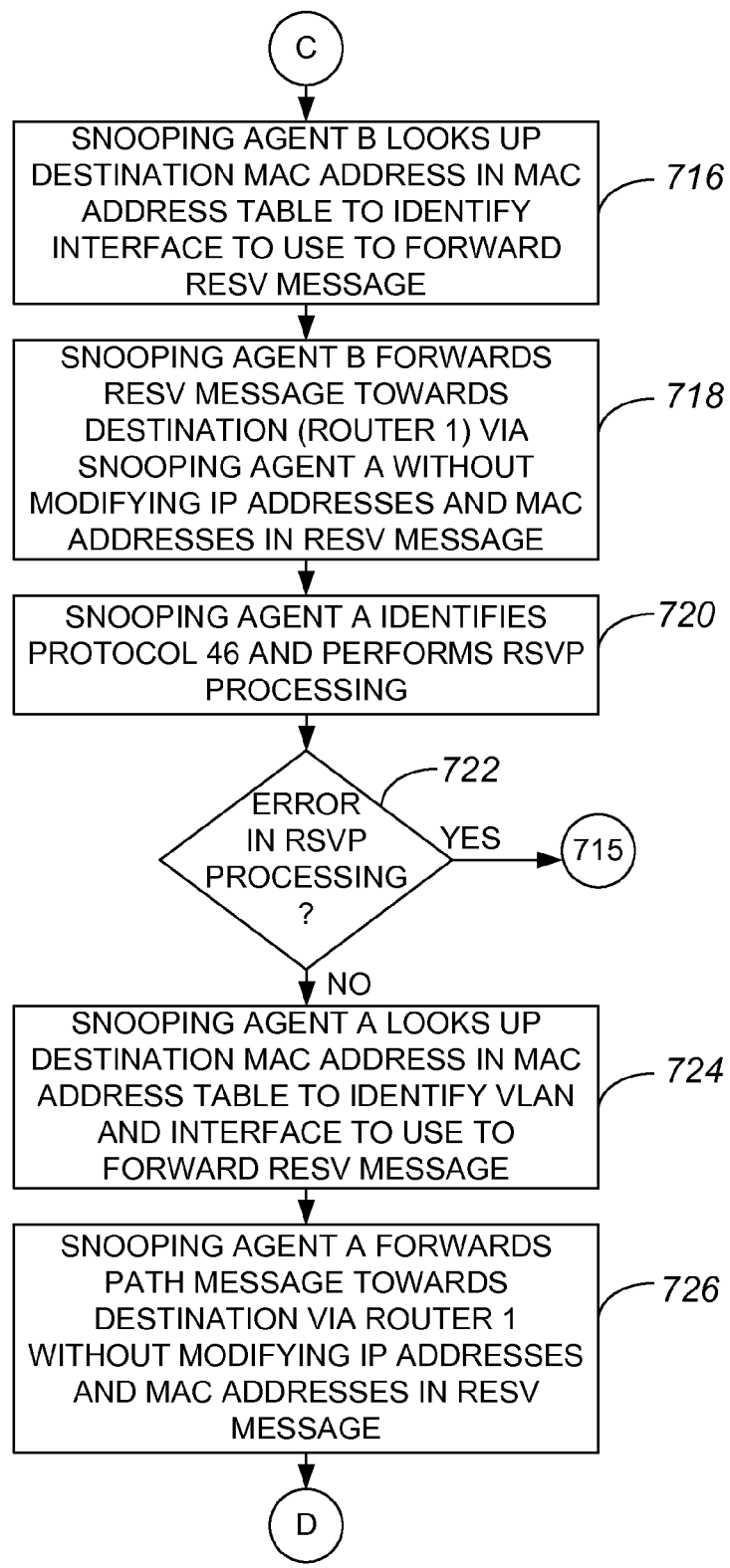
Figures 7C, 8A:
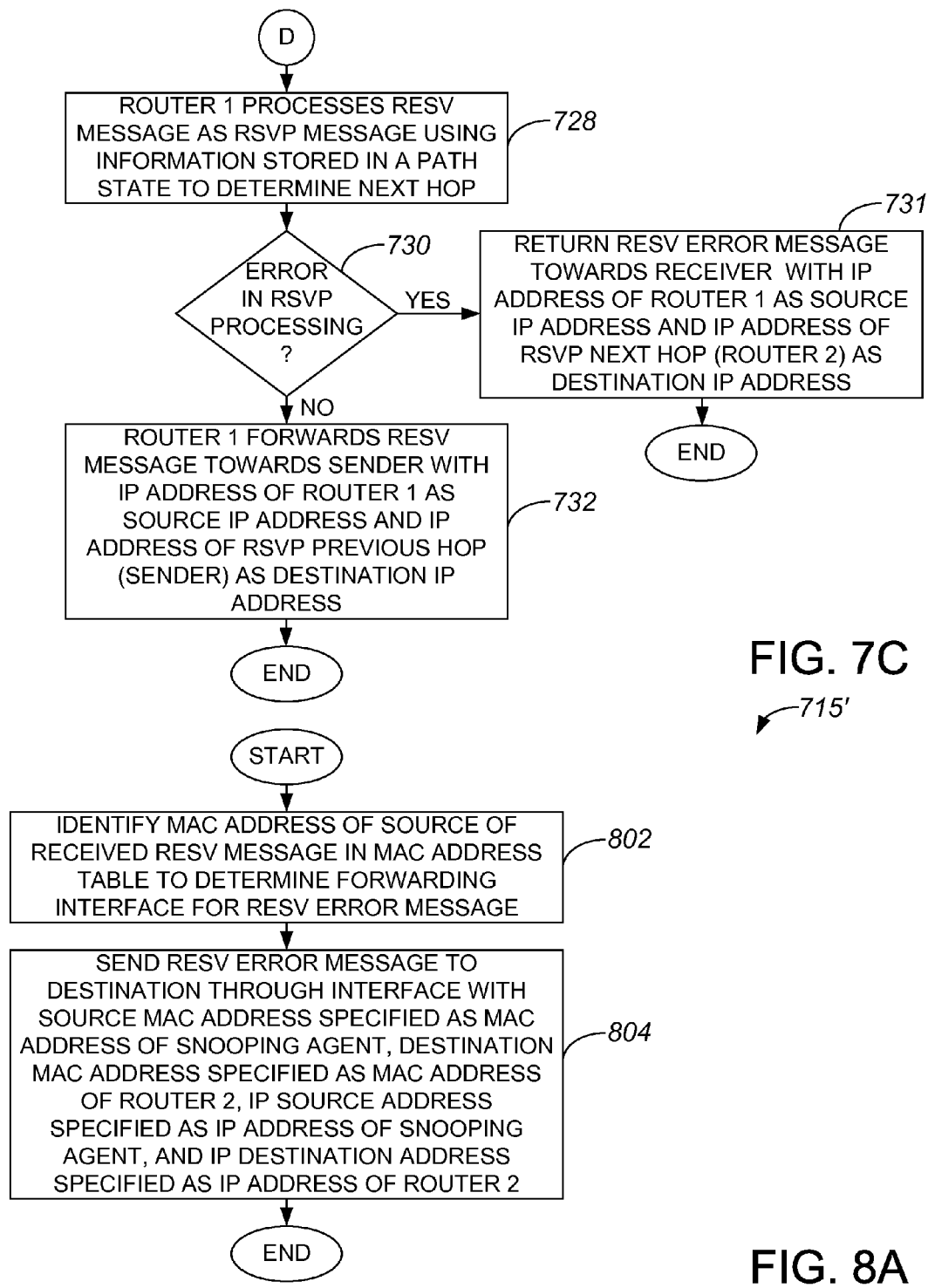
FIG. 8A is a process flow diagram which illustrates a first method of performing error processing in response to a RESV message at a layer 2 agent that is arranged to use RSVP information for on-path signaling, i.e., step 715 of FIG. 7A, in accordance with an embodiment of the present invention.

The successful receipt of a PATH message by an intended destination, i.e., a receiver, generally results in a RESV message being initiated by the intended destination. With reference to FIG. 4A, once receiver DST 418 receives a PATH message initiated by sender SRC 404, receiver DST 418 sends a RESV message towards sender SRC 404 hop-by-hop along the same path traversed by the PATH message. Referring to FIGS. 7A-7C, one method of processing a RESV message in a network that includes at least one RSVP snooping agent, e.g., network 400 of FIG. 4A, will be described in accordance with an embodiment of the present invention. A method 700 of processing a RESV message begins at step 702 in which a receiver DST that received a PATH message originates a RESV message to be forwarded to a sender SRC. The RESV message is routed hop-by-hop using path state information that is set up during the course of processing the preceding PATH message. Hence, the RESV message is specified with a destination address of the RSVP previous hop, i.e., the last RSVP hop before the preceding PATH message was received by receiver DST, and a source address of the receiver DST.

In step 704, router '2' receives the RESV message from the receiver DST, and processes the RESV message as an RSVP message. During the course of processing the RESV message, router '2' uses the information stored in the PATH state to determine the next hop, i.e., the RSVP previous hop, for the RESV message. A determination is made in step 706 as to whether an error has arisen during RSVP processing. If it is determined that an error has arisen, then a RESV error (RESV_ERR) message is returned to the receiver DST in step 707 with the IP address of router '2' specified as the IP address of the source of the RESV_ERR message, and as the RSVP Error Node Address, and the IP address of the RSVP next hop specified as the IP address of the destination to which the RESV_ERR message is being sent. In the described embodiment, the RSVP next hop is receiver DST in this case. The RESV_ERR message may be sent by router '2' after router '2' uses a routing table to identify an appropriate outbound interface for the RESV_ERR message. Once the RESV_ERR message is returned to the receiver DST, the processing of a RESV message is completed.

Returning to step 706, if it is determined that an error has not arisen as a result of RSVP processing, router '2' forwards the RESV message towards the RSVP previous hop, router '1', in the described embodiment. Snooping agent 'B' is the next layer 2 hop in a path to the RSVP previous hop, i.e., router '1'. The RESV message is forwarded by router '2' with a source MAC address of the RESV message set as the MAC address of router '2', a destination MAC address of the RESV message set as the MAC address of router '1', a source IP address of the RESV message set as the IP address of router '1', and a destination IP address of the RESV message set as the IP address of router '2'.

Snooping agent 'B', upon receiving the RESV message from router '2', identifies the RESV message as being an RSVP message in step 712, and performs RSVP processing, including establishment of the corresponding RESV state. During the RSVP processing performed by snooping agent 'B', the source and destination MAC addresses specified in the RESV message are retained. In step 714, it is determined whether an error has occurred during the RSVP processing. An error may be, in one embodiment, an admission control failure. If it is determined that an error has occurred, error processing is performed in step 715. The steps associated with error processing may vary widely. Methods for performing error processing will be described below with reference to FIGS. 8A-8D. After error processing is performed, the processing of a RESV message is completed.

Alternatively, if it is determined in step 714 that the RSVP processing did not result in an error, then snooping agent 'B' obtains the destination MAC address specified in the RESV message and uses the destination MAC address to identify a forwarding interface to use to forward the RESV message in step 716. The forwarding interface may be identified using a MAC address table stored in the device, e.g., Ethernet switch, supporting snooping agent 'B'. After the forwarding interface is identified, snooping agent 'B' forwards the RESV message towards its intended destination, i.e., router '1' via snooping agent 'A' in step 718. The RESV message is forwarded without modifying MAC and IP addresses specified in the RESV message.

Snooping agent 'A' receives the RESV message, and identifies the RESV message as having protocol 46 in step 720. Snooping agent 'A' also performs RSVP processing on the RESV message. A determination is made in step 722 regarding whether an error has arisen as a result of the RSVP processing. If it is determined that an error has arisen, process flow moves from step 722 to step 715 in which error processing is performed. As previously mentioned, methods for performing error processing will be discussed below with respect to FIGS. 8A-8D.

If the determination in step 722 that no error has arisen as a result of the RSVP processing, snooping agent 'A' uses the destination MAC address specified in the RESV message to index into a MAC address table in step 724 to identify a VLAN and a forwarding interface to use to forward the RESV message towards its intended destination. Then, in step 726, snooping agent 'A' forwards the RESV message to router '1' without modifying MAC and IP addresses associated with the RESV message.

When router '1' receives the RESV message, router '1' processes the RESV message as an RSVP message in step 728, and uses the information stored in the Path state to determine the next hop, i.e., the RSVP previous hop, for sending the RESV message. A determination is made in step 730 as to whether an error has occurred during the RSVP processing. If the determination is that an error has occurred, a RESV_ERR message is returned by router '1' towards the receiver DST, i.e., the source of the RESV message, in step 731. The RESV_ERR message has its source IP address set as the IP address of router '1' and its destination IP address set as the IP address of the RSVP next hop which is router '2'. Once the RESV_ERR message is sent by router '1', the processing of a RESV message is completed.

Alternatively, if the determination in step 730 is that no error has occurred during the RSVP processing, router '1' forwards the RESV message towards the sender SRC in step 732, and the processing of a RESV message is successfully completed. The RESV message is forwarded by router '1' with a source IP address of the RESV message set as the IP address of router '1' and a destination IP address of the RESV message set as the IP address of the RSVP previous hop, which is the sender SRC in this case.

As previously mentioned, methods for performing error processing may vary, Suitable methods for performing error processing will be described below with reference to FIGS. 8A-8D. FIG. 8A is a process flow diagram which illustrates a first method of performing error processing in response to a RESV message at a layer 2 agent that is arranged to use RSVP information for on-path signaling, i.e., step 715 of FIG. 7A, in accordance with an embodiment of the present invention. A method 715' for performing error processing begins at step 802 in which a MAC address of a source of a received RESV message is identified in a MAC address table. Such an identification allows a forwarding interface for a RESV error message to be determined. Once the MAC address of the source of the received RESV message is identified, a RESV error message is sent in step 804. The RESV error message is sent to the destination through an interface with a source MAC address specified as the MAC address of the snooping agent, the destination MAC address specified as the MAC address of router '2', the IP source address specified as the IP address of the snooping agent, and the IP destination address specified as the IP address of router '2'. After the RESV error message is sent, error processing is completed.

Figure 8B:
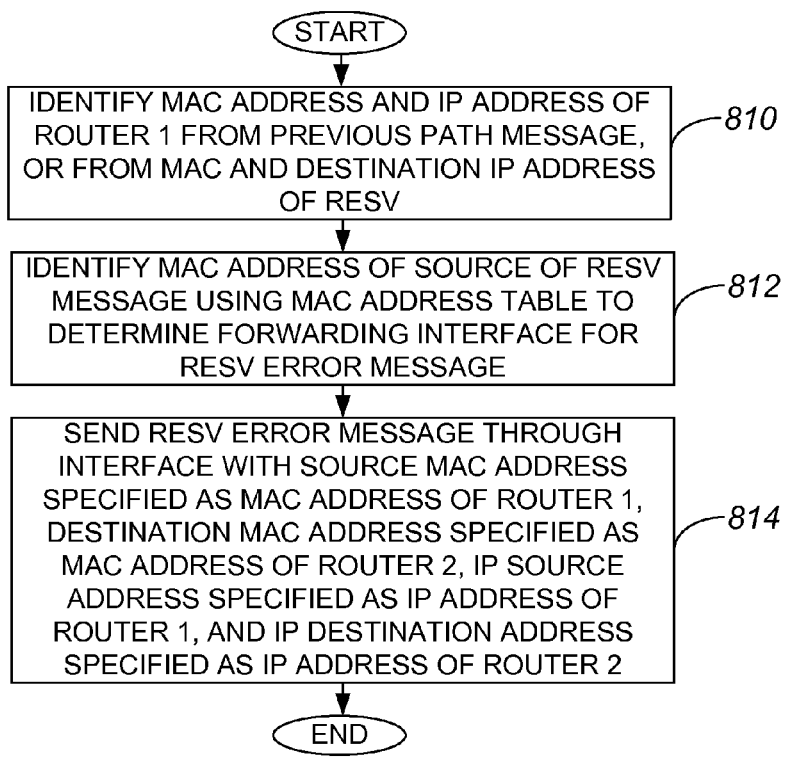
FIG. 8B is a process flow diagram which illustrates a second method of performing error processing in response to a RESV message at a layer 2 agent that is arranged to use RSVP information for on-path signaling, i.e., step 715 of FIG. 7A, in accordance with an embodiment of the present invention.

FIG. 8B is a process flow diagram which illustrates a second method of performing error processing in response to a RESV message at a layer 2 agent that is arranged to use RSVP information for on-path signaling, i.e., step 715 of FIG. 7A, in accordance with an embodiment of the present invention. A method 715" for performing error processing begins at step 810 in which the MAC address and the IP address of router '1' are identified from a previous PATH message, or from MAC and destination IP addresses of a RESV message. In step 812, the MAC address of the source of the RESV message is identified using a MAC address table to determine a forwarding interface for the RESV error message. Finally, in step 814, a RESV error message is sent through the interface with a source MAC address specified as the MAC address of router '1', the destination MAC address specified as the MAC address of router '2', the IP source address specified as the IP address of router '1', and the IP destination address specified as the IP address of router '2'. After the RESV error message is sent, error processing is completed.

Figure 8C:
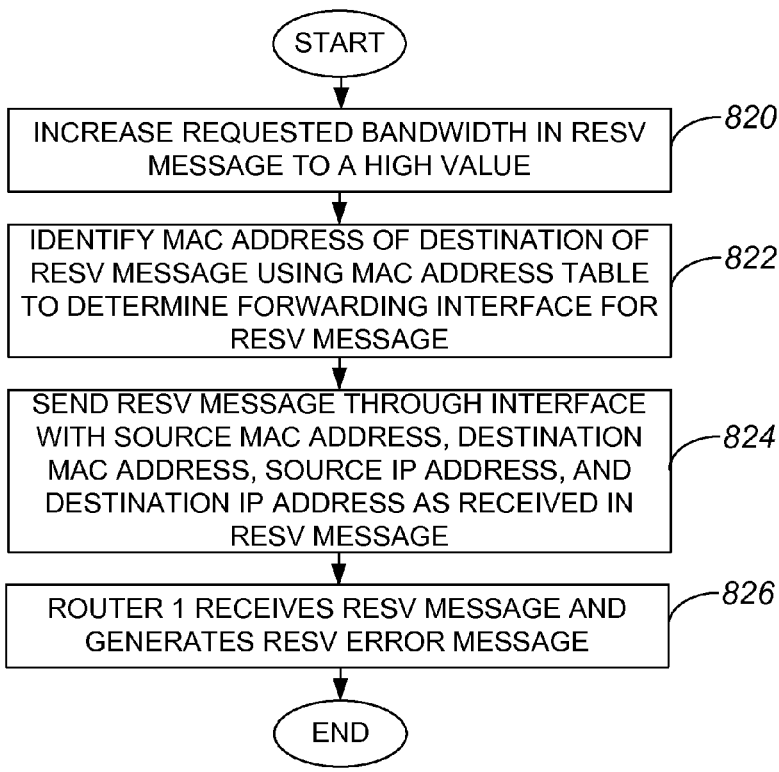
FIG. 8C is a process flow diagram which illustrates a third method of performing error processing in response to a RESV message at a layer 2 agent that is arranged to use RSVP information for on-path signaling, i.e., step 715 of FIG. 7A, in accordance with an embodiment of the present invention.

FIG. 8C is a process flow diagram which illustrates a third method of performing error processing in response to a RESV message at a layer 2 agent that is arranged to use RSVP information for on-path signaling, i.e., step 715 of FIG. 7A, in accordance with an embodiment of the present invention. A method 715''' of processing an error begins at step 820 in which the amount of requested bandwidth in the RESV message is increased to a high value. Then, in step 822, the MAC address of the destination of the RESV message is identified using a MAC address table to determine a forwarding interface for the RESV message. From step 822, process flow moves to step 824 in which the RESV message is sent through the forwarding interface with the source MAC address, the destination MAC address, the source IP address, and the destination IP address as received in the RESV message. When router '1' receives the RESV message, router '1' generates an RESV error message in step 826. In one embodiment, router '1' generates the RESV error message when the high value of the requested bandwidth in the RESV message is identified. Once the RESV error message is generated, error processing is completed.

Figure 8D:
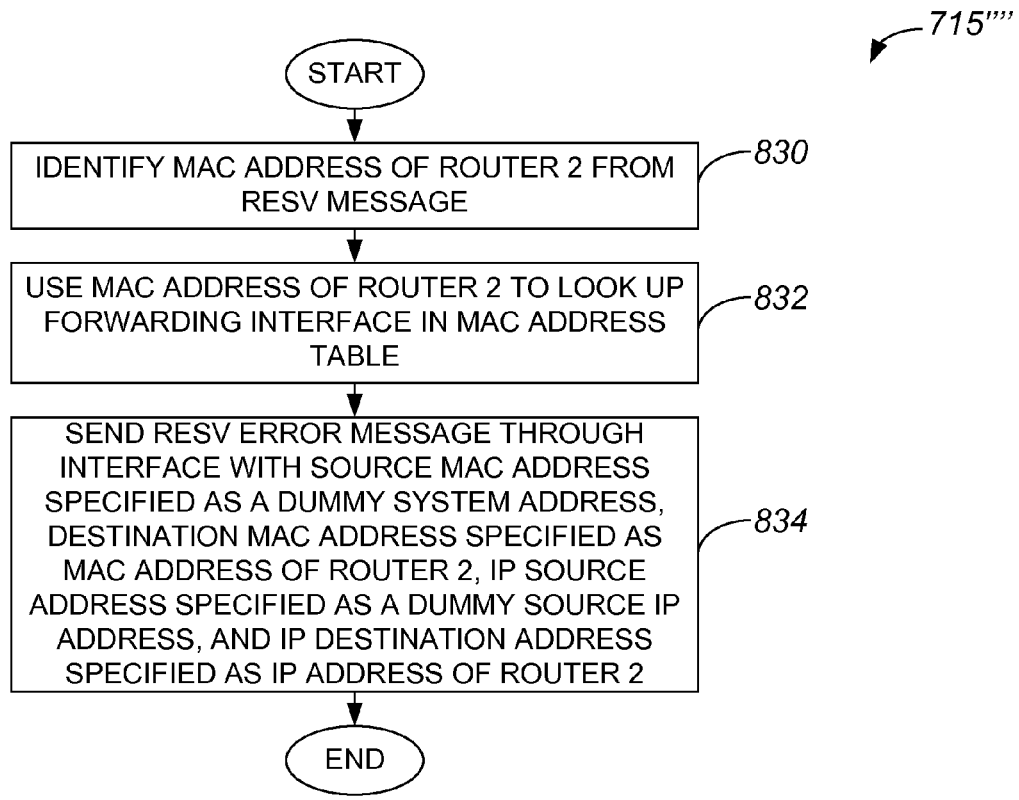
FIG. 8D is a process flow diagram which illustrates a fourth method of performing error processing in response to a RESV message at a layer 2 agent that is arranged to use RSVP information for on-path signaling, i.e., step 715 of FIG. 7A, in accordance with an embodiment of the present invention.

A fourth method of performing error processing in response to a RESV message at a layer 2 agent that is arranged to use RSVP information for on-path signaling, i.e., step 715 of FIG. 7A, will be described with in accordance with an embodiment of the present invention with respect to FIG. 8D. A method 715'''' of processing an error begins at step 830 in which the MAC address of router '2' is identified from the RESV message. Once the MAC address of router '2' is identified, the MAC address is used in step 832 to look up a forwarding interface in the MAC address table. Then, in step 834, a RESV error message is sent through the interface with a source MAC address specified as a dummy system address, a destination MAC address specified as the MAC address of router '2', an IP source address specified as a dummy source IP address, and an IP destination address specified as the IP address of router '2'. After the RESV error message is sent through the interface, the processing of an error is completed.

Although only a few embodiments of the present invention have been described, it should be understood that the present invention may be embodied in many other specific forms without departing from the spirit or the scope of the present invention. By way of example, while a network that includes a plurality of layer 2 elements with RSVP snooping capabilities are being described as being in a path between a source node and a destination node, a single layer 2 element may instead be present between the source node and the destination node. Alternatively, layer 2 elements may be interspersed between multiple layer 3 elements along a path between a source node and a destination node. In general, the number of layer 3 nodes and layer 2 nodes in a path between a source node and a destination node, as well as the relative locations of the nodes, may vary widely.

While RSVP has been described as a protocol that may be snooped to provide layer 2 network elements with on path signaling and admission control capabilities, other protocols may be snooped by layer 2 network elements. That is, the present invention is not limited for use with RSVP, and may also be used for other protocols which provide on path signaling and admission control capabilities.

In one embodiment, snooping agents or layer 2 nodes with RSVP snooping capabilities may be arranged to further prevent RSVP flooding in an overall network by not relaying snooped RSVP message for which a destination MAC address is unknown. An unknown destination MAC address may be a MAC address that is not present in a MAC address table of a layer 2 node that supports a snooping agent. A snooped RSVP message for which a destination MAC address is unknown may effectively be silently discarded, i.e., the snooped RSVP message may be discarded without sending a corresponding RSVP error message.

Snooping agents are not limited to being layer 2 nodes with RSVP snooping capabilities. By way of example, some layer 3 nodes may not have RSVP capabilities. For such layer 3 nodes, RSVP snooping capabilities may be provided without departing from the spirit or the scope of the present invention.

The present invention may be embodied at least in part as code devices or computer code which, in cooperation with processing arrangements, may be executed to enable RSVP processing functionality. In addition, with regards to layer 3 nodes that send ARP messages, the functionality for sending ARP messages may also be embodied as code devices.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A layer 2 device associated with an open systems interconnection (OSI) reference model, the layer 2 device being positioned in a path substantially between layer 3 devices, the layer 2 device comprising:
   a first interface, the first interface being arranged to intercept a first message, the first message being associated with a on-path signaling protocol for at least one selected from a group including resource reservation and admission control at a layer above layer 2;
   a processing arrangement being arranged to process the first message, wherein the processing arrangement is further arranged to determine when a recent topology change is detected and to generate an address resolution protocol (ARP) message; and
   a second interface, the second interface being arranged to send the ARP message and the first message on the path, wherein the ARP message is sent when the recent topology change is detected, the ARP message being sent before the first message is sent, and wherein the ARP message is not sent when the recent topology change is not detected.

2. The layer 2 device of claim 1 wherein the on-path signaling protocol is at an Internet Protocol (IP) layer.

3. The layer 2 device of claim 2 wherein the on-path signaling protocol is a resource reservation protocol (RSVP).

4. The layer 2 device of claim 3 wherein the first message is one selected from the group including a RSVP path message and a RSVP reservation message.

5. The layer 2 device of claim 1 further including:
   a media access control (MAC) address table, wherein the processor arrangement is further arranged to identify a MAC address of an element, the MAC address being identified in the first message, the processor arrangement further being arranged to use the MAC address of the element to index into the MAC address table to identify the second interface as being suitable for use in forwarding the first message towards the element.

6. The layer 2 device of claim 1 wherein the processor arrangement is arranged to generate an error message and to send the error message using the first interface.

7. The layer 2 device of claim 6 wherein the error message is sent to an initiator of the first message.

8. The layer 2 device of claim 1 wherein the processing arrangement is arranged to process the first message to detect an error condition, the error condition being an admission control rejection.

9. The layer 2 device of claim 8 wherein if the error condition is an admission control rejection, the processing arrangement is capable of at least one selected from the group including generating a first error message in which the layer 2 device identifies an on-path signaling hop as a node generating the second error message, and generating a second error message in which the layer 2 device provides at least one dummy address to identify a node generating the second error message.

10. The layer 2 device of claim 1 wherein the processor arrangement is capable of forwarding the first message towards the element without altering the MAC address of the element and internet protocol (IP) addresses included in the first message.

11. The layer 2 device of claim 1 wherein the on-path signaling protocol is an on-path Internet Protocol (IP) reservation protocol.

12. The layer 2 device of claim 1 wherein the first interface is arranged to intercept the first message by intercepting a layer 2 frame containing an Internet Protocol (IP) packet that contains the first message, and wherein the processing arrangement is arranged to process the first message by identifying the IP packet contained within the layer 2 frame.

13. The layer 2 device of claim 1 wherein the layer 2 device is not arranged to support Internet Protocol (IP) forwarding functionality.

14. A method for processing a message associated with an on-path signaling protocol for at least one selected from a group including resource reservation and admission control that is received on a layer 2 device associated with an open systems interconnection (OSI) reference model from an initiator, the layer 2 device being positioned on a path between layer 3 devices, the method comprising:
   receiving the message on the layer 2 device, wherein the message identifies an element to which the message is intended to be forwarded;
   identifying the message as being of the on-path signaling protocol; and
   processing the message;
   determining if processing the message results in an error; and
   generating a first error message if it is determined that processing the message results in the error, wherein the first error message includes an indication that identifies the element to which the message is intended to be forwarded as the source of detecting the error.

15. The method of claim 14 further including:
   identifying a media access control (MAC) address of the element, the MAC address of the element being stored in the message and being associated with a destination of the message, wherein processing the message includes indexing into a MAC address table using the MAC address of the element to identify a forwarding interface for use in forwarding the message towards the destination.

16. The method of claim 15 further including:
   forwarding the error message towards the initiator if it is determined that processing the message results in the error; and
   forwarding the message towards the destination using the forwarding interface if it is determined that processing the message does not result in the error.

17. The method of claim 16 wherein the error message does not identify the layer 2 device as a source of detecting the error.

18. The method of claim 15 further including:
   dropping the message if it is determined that processing the message results in the error.

19. The method of claim 15 wherein processing the message includes detecting an error condition, the error condition being an admission control rejection, wherein it is determined that processing the message results in the error when the error condition is detected.

20. The method of claim 19 wherein if the error condition is an admission control rejection, the method includes modifying the message to cause an admission control rejection in a previous on-path signaling hop.

21. The method of claim 15 wherein the on-path signaling protocol is a resource reservation protocol (RSVP).

22. A layer 2 device associated with an open systems interconnection (OSI) reference model, the layer 2 device being arranged to process a message associated with an on-path signaling protocol for at least one selected from a group including resource reservation and admission control, the layer 2 device being located on a path between layer 3 devices, the layer 2 device comprising:
   means for receiving the message, the message being arranged to identify an element to which the message is to be forwarded by the layer 2 device;
   means for identifying the message as being of the on-path signaling protocol;
   means for identifying a media access control (MAC) address of an element, the MAC address being stored in the message and being associated with a destination of the message;
   means for processing the message, wherein the means for processing the message include means for indexing into a MAC address table using the MAC address to identify a forwarding interface for use in forwarding the message towards the destination on the path; and
   means for generating a first error message if it is determined that processing the message results in the error, wherein the first error message includes an indication that identifies the element to which the message is intended to be forwarded by the layer 2 device as the source of detecting the error.

23. A method for forwarding a resource reservation protocol (RSVP) packet in a network that utilizes a symmetric routing protocol using a switch, the switch having capabilities associated with layer 2 of an open systems interconnection (OSI) reference model, the switch being positioned on a path between layer 3 nodes, the method comprising:
   receiving the RSVP packet from a first node, the RSVP packet being intended for a second node, wherein the first node and the second node are arranged to be in communication with the switch;
   identifying the RSVP packet;
   processing the RSVP packet;
   determining if processing the RSVP packet results in an error;
   sending an error indication to the first node if it is determined that processing the RSVP packet results in the error, wherein the error indication does not identify the switch as the source of the error indication; and
   sending the RSVP packet towards the second node if it is determined that RSVP processing did not result in the error.

24. The method of claim 23 wherein processing the RSVP packet includes identifying a media access control (MAC) address in the RSVP packet associated with the second node and using a MAC address table to identify a suitable interface for sending the RSVP packet towards the second node.

25. The method of claim 23 wherein sending the RSVP packet towards the second node includes sending the RSVP packet towards the second node without modifying the RSVP packet.

26. A switch that is suitable for use in a network that utilizes a symmetric routing protocol, the switch having capabilities associated with layer 2 of an open systems interconnection (OSI) reference model, the switch comprising:
   a receiving arrangement, the receiving arrangement being arranged to receive the RSVP packet from a first node, the RSVP packet being intended for a second node, wherein the first node and the second node are arranged to be in communication with the switch;
   a processing arrangement, the processor arrangement being arranged to identify the RSVP packet and to process the RSVP packet, the processing arrangement further being arranged to determine if an error has resulted when the RSVP packet is processed; and
   a sending arrangement, the sending arrangement being arranged to send an error indication to the first node if it is determined that processing the RSVP packet results in the error, the sending arrangement further being arranged to send the RSVP packet towards the second node if it is determined that RSVP processing did not result in the error, wherein the error indication does not identify the switch as the source of the error indication.

27. The switch of claim 26 wherein the error is an admission control rejection.

28. The switch of claim 27 wherein if the error is the admission control rejection, the error message either identifies a source of the error or indicates a dummy address as a cause of the error.

29. The switch of claim 26 wherein the sending arrangement is further arranged to drop the RSVP packet if it is determined that processing the RSVP packet results in the error.

30. A layer 2 device associated with an open systems interconnection (OSI) reference model, the layer 2 device being positioned in a path substantially between layer 3 devices, the layer 2 device comprising:
   a first interface, the first interface being arranged to intercept a message, the message being associated with a on-path signaling protocol for at least one selected from a group including resource reservation and admission control at a layer above layer 2;
   a processing arrangement being arranged to process the message, wherein the processor arrangement is arranged to generate an error message when an error is detected and to send the error message using the first interface to an initiator of the message; and
   a second interface, the second interface being arranged to send the message on the path, wherein the message identifies an element to which the message is intended to be forwarded, and wherein the error message does not identify the layer 2 device as a source of detecting the error and instead identifies the element as the source of detecting the error.

31. The layer 2 device of claim 30 wherein the on-path signaling protocol is at an Internet Protocol (IP) layer.

32. The layer 2 device of claim 31 wherein the on-path signaling protocol is a resource reservation protocol (RSVP).

33. The layer 2 device of claim 32 wherein the message is one selected from the group including a RSVP path message and a RSVP reservation message.

34. The layer 2 device of claim 30 further including:
   a media access control (MAC) address table, wherein the processor arrangement is further arranged to identify a MAC address of an element, the MAC address being identified in the message, the processor arrangement further being arranged to use the MAC address of the element to index into the MAC address table to identify the second interface as being suitable for use in forwarding the message towards the element.

35. The layer 2 device of claim 34 wherein the processing arrangement is further arranged to generate an address resolution protocol (ARP) message and the second interface is arranged to send the ARP message before sending the message.

* * * * *